United States Patent
Harding et al.

(10) Patent No.: US 7,463,720 B2
(45) Date of Patent: Dec. 9, 2008

(54) SYSTEMS AND METHODS FOR DEVELOPING A PRIMARY COLLIMATOR

(75) Inventors: Geoffrey Harding, Hamburg (DE);
Johannes Paul Delfs, Hamburg (DE)

(73) Assignee: GE Security, Inc., Bradenton, FL (US)

( * ) Notice: Subject to any disclaimer, the term of this patent is extended or adjusted under 35 U.S.C. 154(b) by 0 days.

(21) Appl. No.: 11/531,037

(22) Filed: Sep. 12, 2006

(65) Prior Publication Data
US 2008/0063146 A1 Mar. 13, 2008

(51) Int. Cl.
*G21K 1/02* (2006.01)
(52) U.S. Cl. .................. 378/147; 378/148; 378/901
(58) Field of Classification Search ......... 378/145–154, 378/205, 207; 250/370.09
See application file for complete search history.

(56) References Cited

U.S. PATENT DOCUMENTS

| | | | |
|---|---|---|---|
| 4,236,356 A | 12/1980 | Ward | |
| 4,679,973 A | 7/1987 | Kodama et al. | |
| 4,787,147 A | 11/1988 | Wiley | |
| 5,859,893 A | 1/1999 | Moorman et al. | |
| 6,208,712 B1 * | 3/2001 | Hernandez-Guerra | 378/150 |
| 6,304,628 B1 * | 10/2001 | Steinberg | 378/65 |
| 2002/0080923 A1 * | 6/2002 | Boomgaarden | 378/207 |
| 2007/0133749 A1 | 6/2007 | Mazin et al. | |
| 2007/0189460 A1 * | 8/2007 | Buck et al. | 378/146 |

OTHER PUBLICATIONS

U.S. Appl. No. 11/434,431, filed May 15, 2006, Geoffrey Harding.
U.S. Appl. No. 11/504,263, filed Aug. 15, 2007, Geoffrey Harding.
U.S. Appl. No. 11/498,114, filed Aug. 2, 2006, Geoffrey Harding.
U.S. Appl. No. 11/498,113, filed Aug. 2, 2006, Geoffrey Harding.
U.S. Appl. No. 11/484,186, filed Jul. 11, 2006, Geoffrey Harding.
U.S. Appl. No. 11/416,526, filed May 3, 2006, Geoffrey Harding.
U.S. Appl. No. 11/541,716, filed Sep. 29, 2006, Geoffrey Harding.
U.S. Appl. No. 11/531,019, filed Sep. 12, 2006, Geoffrey Harding.

(Continued)

*Primary Examiner*—Irakli Kiknadze
(74) *Attorney, Agent, or Firm*—Eugene Hyun, Esq.; Armstrong Teasdale LLP

(57) ABSTRACT

A method for developing a multi-focus primary collimator is described. The method includes extending a first beam from a first source via a collimator block to a first detector and determining a size of the first beam.

22 Claims, 11 Drawing Sheets

OTHER PUBLICATIONS

U.S. Appl. No. 11/434,486, filed May 15, 2006, Geoffrey Harding.

U.S. Appl. No. 11/434,291, filed 5/q5/06, Geoffrey Harding.

U.S. Appl. No. 11/504,395, filed Aug. 18, 2006, Geoffrey Harding.

Hubbell, J.H., Veigele, W.J., Briggs, E.A., Brown, R.T., Cromer, D.T., Howerton, R.J., "Atomic Form Factors, Incoherent Scattering Functions and Photon Scattering Cross-sections," Journal of Physics and Chemical Reference Data, vol. 4, No. 3, pp. 471-538 (1975).

Hubbell, J.H., Veigele, W.J., Briggs, E.A., Brown, R.T., Cromer, D.T., Howerton, R.J., "Erratum; Atomic Form Factors, Incoherent Scattering Functions, and Photon Scattering Cross Sections," Journal of Physics and Chemical Reference Data, vol. 6, pp. 615-616 (1977).

Schlomka et al., "Coherent Scatter Computer Tomography—A Novel Medical Imaging Technique,"Physics of Medical Imaging, Proceedings of SPIE—vol. 5030, pp. 256-265 (2003).

Rabiej M., "Determination of the Degree of Crystallinity of Semicrystalline Polymers by Means of the 'OptiFit' Computer Software," Polimery 6, pages 423-427 (2002).

"Percentage Crystallinity Determination by X-Ray Diffraction," XRD-6000 Application Brief, Kratos Analytical—A Shimadzu Group Company, pp. 1-5 (1999).

A.M. Hindeleh and D. J. Johnson, "The Resolution of Multipeak Data in Fibre Science," J. Phys. D: Appl. Phys., vol. 4, Printed in Great Britain, pp. 259-263 (1971).

International Search Report for PCT/2007/074933; mail date Mar. 12, 2008.

* cited by examiner

SYSTEMS AND METHODS FOR DEVELOPING A PRIMARY COLLIMATOR

BACKGROUND OF THE INVENTION

This invention relates generally to imaging systems and methods for and more particularly to systems and methods for developing a primary collimator.

In x-ray diffraction imaging devices (XRDs), a baggage check is carried out by a fan beam. The fan beam is obtained through a primary collimator which allows a narrow beam of primary radiation of an electron beam source to pass through. An item of luggage to be examined is struck by the fan beam. Radiation scattered from an area to be examined of the item of luggage is projected onto a detector field. In order to reduce a measurement time, in an x-ray diffraction imaging device, a plurality of detectors are used.

However, in fabricating the primary collimator, unnecessary scatter may increase. Moreover, as a number of detectors that detect the radiation increases, it becomes more difficult to fabricate the primary collimator.

BRIEF DESCRIPTION OF THE INVENTION

In one aspect, a method for developing a multi-focus primary collimator is described. The method includes extending a first beam from a first source via a collimator block to a first detector and determining a size of the first beam.

In another aspect, a processor is described. The processor is configured to extend a first beam from a first source via a collimator block to a first detector and determine a size of the first beam.

In yet another aspect, an imaging system is described. The imaging system includes a source configured to generate energy, a detector configured to detect a portion of the energy, and a processor coupled to the detector and configured to extend a first beam from a first source via a collimator block to a first detector. The processor is also configured to determine a size of the first beam.

DETAILED DESCRIPTION OF THE INVENTION

Figure 1:
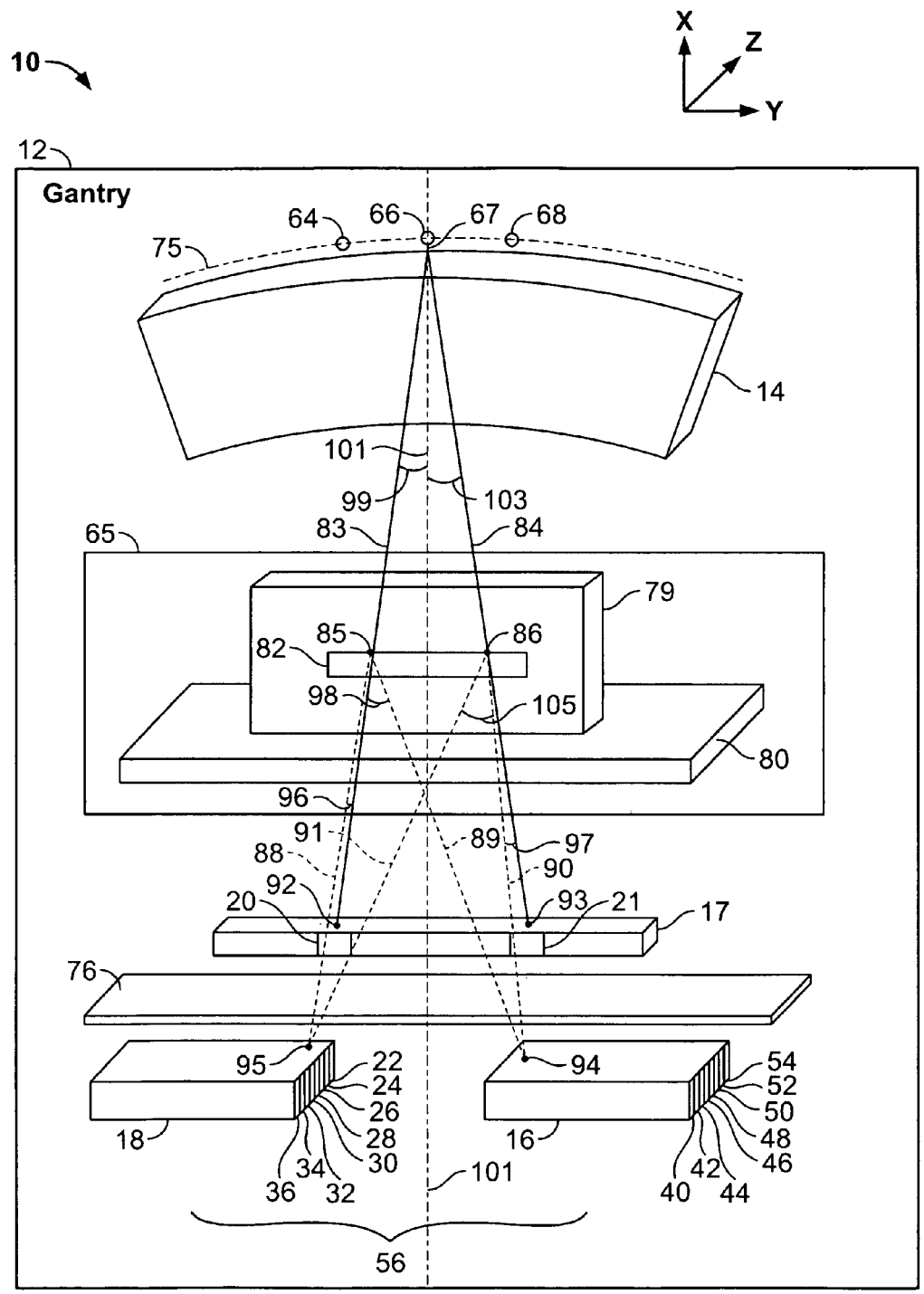
FIG. 1 is an isometric view of an embodiment of a system implementing a primary collimator.

FIG. 1 is an isometric view of an embodiment of a system 10 implementing a primary collimator. System 10 includes a gantry 12. Gantry 12 includes a primary collimator 14, which is a multi-focus primary collimator, a scatter detector 16, a transmission detector 17, a scatter detector 18, and a secondary collimator 76. Each scatter detector 16 and 18 is a segmented semiconductor detector.

Transmission detector 17 includes a plurality of detector elements, such as detector elements 20 and 21. Scatter detector 18 includes a plurality of detector cells or detector elements 22, 24, 26, 28, 30, 32, 34, and 36 for detecting coherent scatter. Scatter detector 16 includes a plurality of detector cells or detector elements 40, 42, 44, 46, 48, 50, 52, and 54 for detecting coherent scatter. Each of scatter detectors 16 and 18 include any number, such as, ranging from and including 5 to 1200, of detector elements. For example, scatter detector 18 includes a number, such as ranging from and including 5 to 40, of detector elements in a z-direction parallel to a z-axis, and a number, such as ranging from and including 1 to 30 detector elements in a y-direction parallel to a y-axis. An x-axis, the y-axis, and the z-axis are located within an xyz co-ordinate system. The x-axis is perpendicular to the y-axis and the z-axis, and the y-axis is perpendicular to the z-axis, and the x-axis is parallel to an x-direction. A number of detector elements within scatter detector 16 is the same as a number of detector elements within scatter detector 18.

Scatter detector 16 is separate from scatter detector 18. For example, scatter detector 16 has a housing that is separate from a housing of scatter detector 18. As another example scatter detectors 16 and 18 are separated from each other by a gap. As yet another example, a shortest distance 56 between a center of scatter detector 16 and a center of scatter detector 18 ranges from and including 40 millimeters (mm) to 200 mm. Each of scatter detector 16, scatter detector 18, and transmission detector 17 are located in the same yz plane. The yz plane is formed by the y-axis and the z-axis. Each of scatter detector 16 and scatter detector 18 is separate from transmission detector 17 by a shortest distance ranging from and including 30 mm to 60 mm in the z-direction.

Gantry 12 further includes a plurality of x-ray sources 64, 66, and 68. In an alternative embodiment, gantry 12 includes any number, such as one, two, four, five, or ten x-ray sources. X-ray sources 64, 66, and 68, and transmission detector 17 form an inverse single-pass multi-focus imaging system. X-ray sources 64, 66, and 68 have an inverse fan-beam geometry that includes a symmetric location of the x-ray sources 64, 66, and 68 relative to the z-axis. X-ray sources 64, 66, and 68, are located parallel to and coincident with an arc 75. It is noted that in an alternative embodiment, system 10 includes a higher number, such as 10 or 20, or alternatively a lower number, such as 4 or 6, of x-ray sources than that shown in FIG. 1. A center of transmission detector 17 is located at a center of circle having arc 75. Each x-ray source 64, 66, and 68 is an x-ray source that includes a cathode and an anode. Alternatively, each x-ray source 64, 66, and 68 is an x-ray source that includes a cathode and all x-ray sources 64, 66, and 68 share a common anode.

A container 79 is placed on a support 80 between a set of x-ray sources 64, 66, and 68, and a set of scatter detectors 16 and 18. Container 79 and support 80 are located within an opening 65 of gantry 12. Examples of container 79 include a bag, a box, and an air cargo container. Examples of each x-ray source 64, 66, and 68 include a polychromatic x-ray source. Container 79 includes a substance 82. Examples of substance 82 include an organic explosive, an amorphous substance having a crystallinity of less than twenty five percent, a quasi-amorphous substance having a crystallinity at least equal to twenty-five percent and less than fifty percent, and a partially crystalline substance having a crystallinity at least equal to fifty percent and less than one-hundred percent. Examples of the amorphous, quasi-amorphous, and partially crystalline substances include a gel explosive, a slurry explosive, an explosive including ammonium nitrate, and a special nuclear material. Examples of the special nuclear material include plutonium and uranium. Examples of support 80 include a table and a conveyor belt. An example of each scatter detector 16 and 18 includes a segmented detector fabricated from Germanium.

X-ray source 66 emits an x-ray beam 67 in an energy range, which is dependent on a voltage applied by a power source to x-ray source 66. Primary collimator 14 generates two primary beams 83 and 84, such as pencil beams, upon collimating x-ray beam 67 from x-ray source 66. In an alternative embodiment, primary collimator 14 collimates x-ray beam 67 received from x-ray source 66 to generate a plurality, such as three or fourth, primary beams. A number of primary beams generated by primary collimator 14 is equal to or alternatively greater than a number of scatter detectors on one side of transmission detector 17 and on one side of the y-axis. Primary beams 83 and 84 pass through a plurality of points 85 and 86 on substance 82 within container 79 arranged on support 80 to generate scattered radiation 88, 89, 90, and 91. For example, primary beam 83 passes through point 85 to generate scattered radiation 88 and 89. As another example, primary beam 84 passes through point 86 to generate scattered radiation 90 and 91.

Secondary collimator 76 is located between support 80 and a set of scatter detectors 16 and 18. Secondary collimator 76 includes a number of collimator elements, such as sheets, slits, or laminations, to ensure that scattered radiation arriving at scatter detectors 16 and 18 have constant scatter angles with respect to primary beams 83 and 84 and that a position of scatter detectors 16 and 18 permits a depth in container 79 at which the scattered radiation originated to be determined. For example, the collimator elements of secondary collimator 76 are arranged parallel to a direction of scattered radiation 88 and of scattered radiation 90 to absorb scattered radiation that is not parallel to the direction of the scattered radiation 88 and of scattered radiation 90.

The number of collimator elements in secondary collimator 76 provided is equal to or alternatively greater than a number of detector elements of any one of scatter detectors 16 and 18 and the collimator elements are arranged such that scattered radiation between neighboring collimator elements is incident on one of the detector elements. The collimator elements of scatter detectors 16 and 18 are made of a radiation-absorbing material, such as, steel, copper, silver, or tungsten.

Underneath support 80, there is arranged transmission detector 17, which measures an intensity of primary beam 83 at a point 92 on transmission detector 17 and an intensity of primary beam 84 at a point 93 on transmission detector 17. Moreover, underneath support 80, there are arranged scatter detectors 16 and 18 that measure photon energies of scattered radiation received by scatter detectors 16 and 18. Each of scatter detectors 16 and 18 measures the x-ray photons within scattered radiation received by scatter detectors 16 and 18 in an energy-sensitive manner by outputting a plurality of electrical output signals linearly dependent on a plurality of energies of the x-ray photons detected from within the scattered radiation. Scatter detector 16 measures scattered radiation 90 received at a point 94 on scatter detector 16 and scatter detector 18 measures scattered radiation 88 received at a point 95 on scatter detector 18. An example of a shortest distance between points 85 and 95 includes a distance ranging from and including 900 mm to 1100 mm. An example of a distance between points 95 and 92 includes a distance ranging from and including 25 mm to 80 mm.

Scatter detectors 16 and 18 detect scattered radiation to generate a plurality of electrical output signals. Scatter detector 16 detects scattered radiation 90 generated upon intersection of primary beam 84 with point 86. Moreover, scatter detector 16 detects at least a portion of scattered radiation 89 generated upon intersection of primary beam 83 with point 85. Scatter detector 18 detects scattered radiation 88 generated upon intersection of primary beam 83 with point 85. Moreover, scatter detector 18 detects at least a portion of scattered radiation 91 generated upon intersection of primary beam 84 with point 86. A scatter angle 96 formed between primary beam 83 and scattered radiation 88 is equal to a scatter angle 97 formed between primary beam 84 and scattered radiation 90. An example of each of scatter angles 96 and 97 includes an angle ranging from and including 0.025 radians to 0.045 radians. An example of a scatter angle 98 formed between primary beam 83 and scattered radiation 89 ranges from and including 0.05 radians to 0.09 radians. Moreover, an example of a scatter angle 105 formed between primary beam 84 and scattered radiation 91 ranges from and including 0.05 radians to 0.09 radians. Scatter angle 98 is at least twice of any of scatter angles 96 and 97 and scatter angle 105 is at least twice of any of scatter angles 96 and 97. An angle 99 formed by primary beam 83 with respect to a center 101 between scatter detectors 16 and 18 is equal to an angle 103 formed by primary beam 84 with respect to center 101. In another alternative embodiment, system 10 includes additional scatter detectors other than scatter detectors 16 and 18. The additional scatter detectors are placed on a side of transmission detector 17 that is the same as a side of placement of scatter detectors 16 and 18. Moreover, the additional scatter detectors are the same as scatter detectors 16 and 18. For example, any one of the additional scatter detectors have the same number of detector elements as that of any of scatter detectors 16 and 18.

Figure 2:
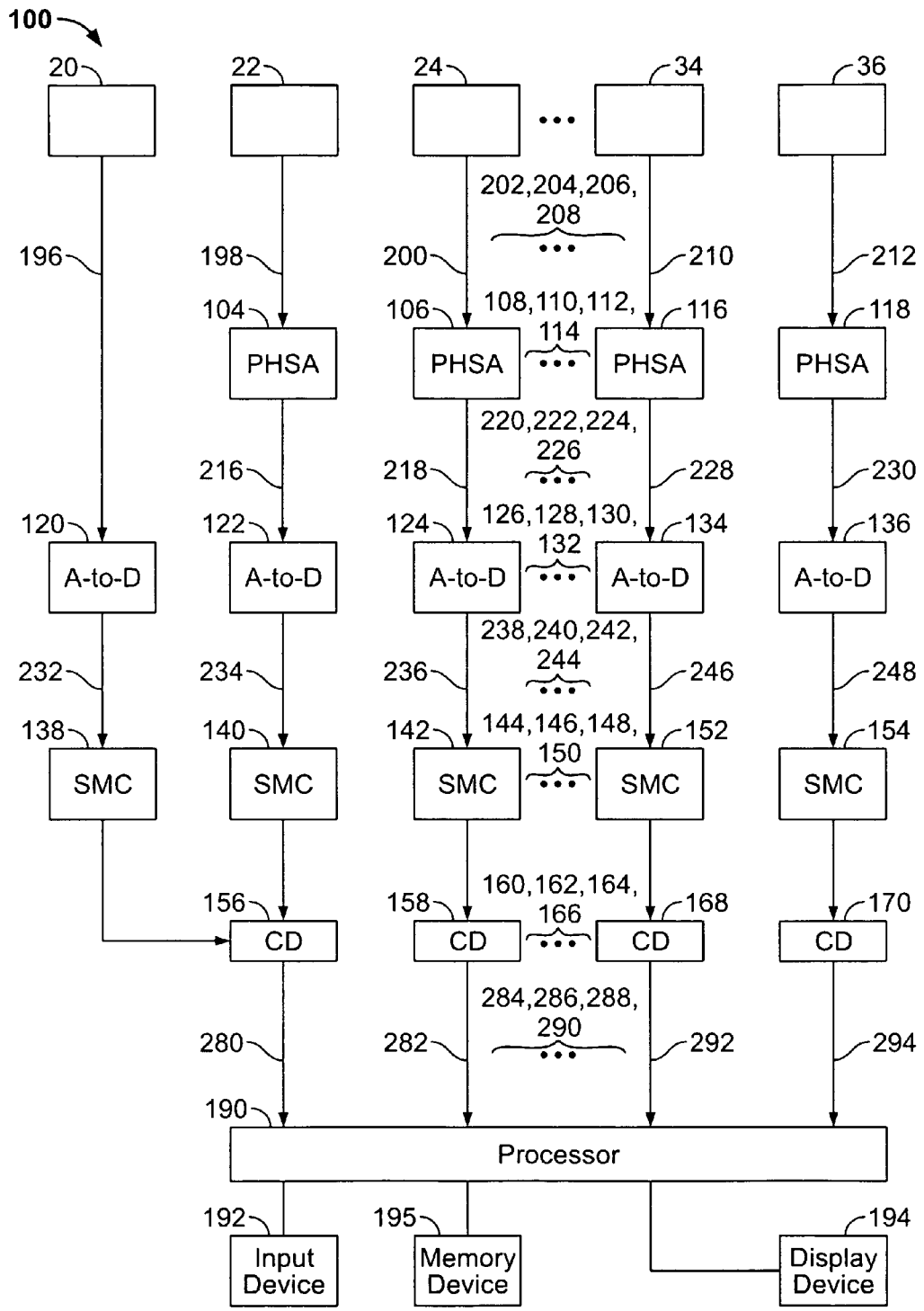
FIG. 2 is block diagram of an embodiment of a system for generating a diffraction profile of a substance.

FIG. 2 is block diagram of an embodiment of a system 100 for generating a diffraction profile of a substance. System 100 includes detector element 20 of transmission detector 17, scatter detector elements 22, 24, 26, 28, 30, 32, 34, and 36, a plurality of pulse-height shaper amplifiers (PHSA) 104, 106, 108, 110, 112, 114, 116, and 118, a plurality of analog-to-digital (A-to-D) converters 120, 122, 124, 126, 128, 130, 132, 134, and 136, a plurality of spectrum memory circuits (SMCs) 138, 140, 142, 144, 146, 148, 150, 152, and 154 allowing pulse height spectra to be acquired, a plurality of correction devices (CDs) 156, 158, 160, 162, 164, 166, 168, and 170, a processor 190, an input device 192, a display device 194, and a memory device 195. As used herein, the term processor is not limited to just those integrated circuits referred to in the art as a processor, but broadly refers to a computer, a microcontroller, a microcomputer, a programmable logic controller, an application specific integrated circuit, and any other programmable circuit. The computer may include a device, such as, a floppy disk drive or CD-ROM drive, for reading data including the methods for developing a primary collimator from a computer-readable medium, such as a floppy disk, a compact disc-read only memory (CD-ROM), a magneto-optical disk (MOD), or a digital versatile disc (DVD). In another embodiment, processor 190 executes instructions stored in firmware. Examples of display device 194 include a liquid crystal display (LCD) and a cathode ray tube (CRT). Examples of input device 192 include a mouse and a keyboard. Examples of memory device 195 include a random access memory (RAM) and a read-only memory (ROM). An example of each of correction devices 156, 158, 160, 162, 164, 166, 168, and 170 include a divider circuit. Each of spectrum memory circuits 138, 140, 142, 144, 146, 148, 150, 152, and 154 includes an adder and a memory device, such as a RAM or a ROM.

Detector element 20 is coupled to analog-to-digital converter 120, and detector elements 22, 24, 26, 28, 30, 32, 34, and 36 are coupled to pulse-height shaper amplifiers 104, 106, 108, 110, 112, 114, 116, and 118, respectively. Detector element 20 generates an electrical output signal 196 by detecting primary beam 83 and detector elements 22, 24, 26, 28, 30, 32, 34, and 36 generate a plurality of electrical output signals 198, 200, 202, 204, 206, 208, 210, and 212 by detecting scattered radiation. For example, detector element 22 generates electrical output signal 198 for each scattered x-ray photon incident on detector element 22. Each pulse-height shaper amplifier amplifies an electrical output signal received from a detector element. For example, pulse-height shaper amplifier 104 amplifies electrical output signal 198 and pulse-height shaper amplifier 106 amplifies electrical output signal 200. Pulse-height shaper amplifiers 104, 106, 108, 110, 112, 114, 116, and 118 have a gain factor determined by processor 190.

An amplitude of an electrical output signal output from a detector element is proportional to an energy of an x-ray quantum that is detected by the detector element to generate the electrical output signal. For example, an amplitude of electrical output signal 196 is proportional to an energy of an x-ray quantum in primary beam 83 detected by detector element 20. As another example, an amplitude of electrical output signal 198 is proportional to an energy of an x-ray quantum within scattered radiation that is detected by detector element 22.

A pulse-height shaper amplifier generates an amplified output signal by amplifying an electrical output signal generated from a detector element. For example, pulse-height shaper amplifier 104 generates an amplified output signal 216 by amplifying electrical output signal 198 and pulse-height shaper amplifier 106 generates an amplified output signal 218 by amplifying electrical output signal 200. Similarly, a plurality of amplified output signals 220, 222, 224, 226, 228, and 230 are generated. An analog-to-digital converter converts an output signal from an analog form to a digital form to generate a digital output signal. For example, analog-to-digital converter 120 converts electrical output signal 196 from an analog form to a digital format to generate a digital output signal 232 and analog-to-digital converter 122 converts amplified output signal 216 from an analog form to a digital format to generate a digital output signal 234. Similarly, a plurality of digital output signals 236, 238, 240, 242, 244, 246, and 248 are generated by analog-to-digital converters 124, 126, 128, 130, 132, 134, and 136, respectively. A digital value of a digital output signal generated by an analog-to-digital converter represents an amplitude of energy of a pulse of an amplified output signal. For example, a digital value of digital output signal 234 output by analog-to-digital converter 122 is a value of an amplitude of a pulse of amplified output signal 216. Each pulse is generated by an x-ray quantum, such as an x-ray photon.

An adder of a spectrum memory circuit adds a number of pulses in a digital output signal. For example, when analog-to-digital converter 122 converts a pulse of amplified output signal 216 into digital output signal 234 to determine an amplitude of the pulse of amplified output signal 216, an adder within spectrum memory circuit 140 increments, by one, a value within a memory device of spectrum memory circuit 140. Accordingly, at an end of an x-ray examination of substance 82, a memory device within a spectrum memory circuit stores a number of x-ray quanta detected by a detector element. For example, a memory device within spectrum memory circuit 142 stores a number of x-ray photons detected by detector element 24 and each of the x-ray photons has an amplitude of energy or alternatively an amplitude of intensity that is determined by analog-to-digital converter 124.

A correction device receives a number of x-ray quanta that have a range of energies and are stored within a memory device of one of spectrum memory circuits 140, 142, 144, 146, 148, 150, 152, and 154, and divides the number by a number of x-ray quanta having the range of energies received from a memory device of spectrum memory circuit 138. For example, correction device 156 receives a number of x-ray photons having a range of energies from a memory device of spectrum memory circuit 140, and divides the number by a number of x-ray photons having the range received from a memory device of spectrum memory circuit 138. Each correction device outputs a correction output signal that represents a range of energies within x-ray quanta received by a detector element. For example, correction device 156 outputs a correction output signal 280 representing an energy spectrum or alternatively an intensity spectrum within x-ray quanta detected by detector element 22. As another example, correction device 158 outputs correction output signal 282 representing an energy spectrum within x-ray quanta detector element 24. Similarly, a plurality of correction output signals 284, 286, 288, 290, 292, and 294 are generated by correction devices 160, 162, 164, 166, 168, and 170, respectively.

It is noted that a number of pulse-height shaper amplifiers 104, 106, 108, 110, 112, 114, 116, and 118 changes with a number of scatter detector elements 22, 24, 26, 28, 30, 32, 34, and 36. For example, five pulse-height shaper amplifiers are used for amplifying signals received from five scatter detector elements. As another example, four pulse-height shaper amplifiers are used for amplifying signals received from four scatter detector elements. Similarly, a number of analog-to-digital converters 120, 122, 124, 126, 128, 130, 132, 134, and 136 changes with a number of detector elements 20, 22, 24, 26, 28, 30, 32, 34, and 36 and a number of spectrum memory circuits 138, 140, 142, 144, 146, 148, 150, 152, and 154 changes with the number of detector elements 20, 22, 24, 26, 28, 30, 32, 34, and 36.

Figure 3:
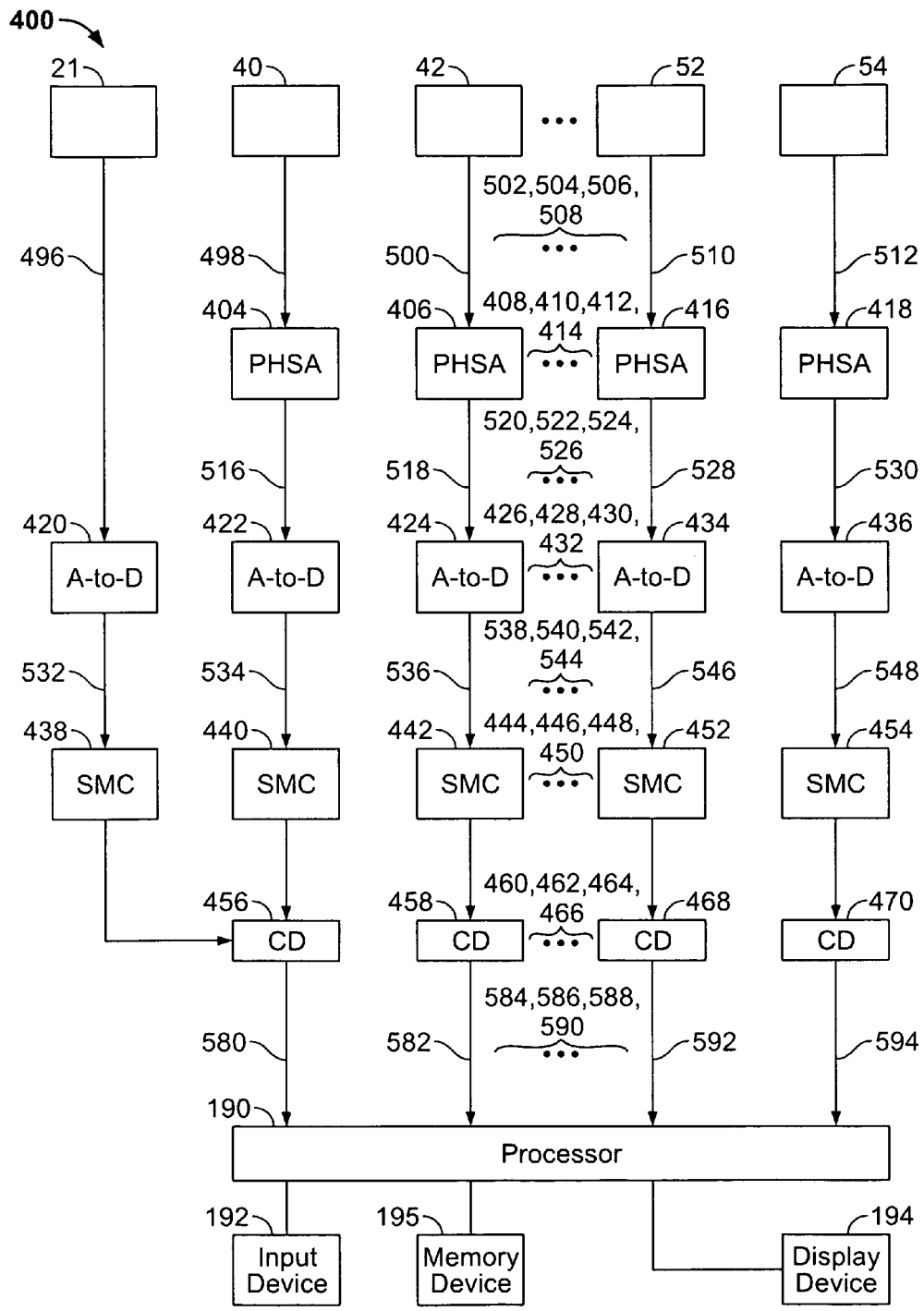
FIG. 3 is a block diagram of an embodiment of a system for generating a diffraction profile of a substance.

FIG. 3 is a diagram of an embodiment of a system 400 for generating a diffraction profile of a substance. System 400 includes detector element 21 of transmission detector 17, scatter detector elements 40, 42, 44, 46, 48, 50, 52, and 54, a plurality of pulse-height shaper amplifiers (PHSA) 404, 406, 408, 410, 412, 414, 416, and 418, a plurality of analog-to-digital (A-to-D) converters 420, 422, 424, 426, 428, 430, 432, 434, and 436, a plurality of spectrum memory circuits (SMCs) 438, 440, 442, 444, 446, 448, 450, 452, and 454 allowing pulse height spectra to be acquired, a plurality of correction devices (CDs) 456, 458, 460, 462, 464, 466, 468, and 470, processor 190, input device 192, display device 194, and memory device 195. An example of each of correction devices 456, 458, 460, 462, 464, 466, 468, and 470 include a divider circuit. Each of spectrum memory circuits 438, 440, 442, 444, 446, 448, 450, 452, and 454 include an adder and a memory device, such as a RAM or a ROM.

Transmission detector element 21 generates an electrical output signal 496 by detecting primary beam 84 and scatter detector elements 40, 42, 44, 46, 48, 50, 52, and 54 generate a plurality of electrical output signals 498, 500, 502, 504, 506, 508, 510, and 512 by detecting scattered radiation. For example, transmission detector element 21 generates electrical output signal 496 for x-ray photons incident on transmission detector element 21. Scatter detector elements 40, 42, 44, 46, 48, 50, 52, and 54 are coupled to pulse-height shaper amplifiers 404, 406, 408, 410, 412, 414, 416, and 418, respectively. Each pulse-height shaped amplifier amplifies an electrical output signal received from a detector element. For example, pulse-height shaper amplifier 404 amplifies electrical output signal 498. Pulse-height shaper amplifiers 404, 406, 408, 410, 412, 414, 416, and 418 have a gain factor determined by processor 190.

An amplitude of an electrical output signal output from a detector element is proportional to an energy of an x-ray quantum that is detected by the detector element to generate the electrical output signal. For example, an amplitude of electrical output signal 496 is proportional to an energy of an x-ray quantum in primary beam 84 detected by detector element 21. As another example, an amplitude of electrical output signal 498 is proportional to an energy of an x-ray quantum within scattered radiation that is detected by detector element 40.

A pulse-height shaper amplifier generates an amplified output signal by amplifying an electrical output signal generated from a detector element. For example, pulse-height shaper amplifier 404 generates an amplified output signal 516 by amplifying electrical output signal 498 and pulse-height shaper amplifier 406 generates an amplified output signal 518 by amplifying electrical output signal 500. Similarly, a plurality of amplified output signals 520, 522, 524, 526, 528, and 530 are generated. An analog-to-digital converter converts an output signal from an analog form to a digital form to generate a digital output signal. For example, analog-to-digital converter 420 converts electrical output signal 496 from an analog form to a digital format to generate a digital output signal 532 and analog-to-digital converter 422 converts amplified output signal 516 from an analog form to a digital format to generate a digital output signal 534. Similarly, a plurality of digital output signals 536, 538, 540, 542, 544, 546, and 548 are generated by analog-to-digital converters 424, 426, 428, 430, 432, 434, and 436, respectively. A digital value of a digital output signal generated by an analog-to-digital converter represents an amplitude of energy or alternatively an amplitude of intensity of a pulse of an amplified output signal. For example, a digital value of digital output signal 534 output by analog-to-digital converter 422 is a value of an amplitude of a pulse of amplified output signal 516.

An adder of a spectrum memory circuit adds a number of pulses in a digital output signal. For example, when analog-to-digital converter 422 converts a pulse of amplified output signal 516 into digital output signal 534 to determine an amplitude of the pulse of amplified output signal 516, an adder within spectrum memory circuit 440 increments, by one, a value within a memory device of spectrum memory circuit 440. Accordingly, at an end of an x-ray examination of substance 82, a memory device within a spectrum memory circuit stores a number of x-ray quanta detected by a detector element. For example, a memory device within spectrum memory circuit 442 stores a number of x-ray photons detected by detector element 42 and each of the x-ray photons has an amplitude of energy that is determined by analog-to-digital converter 424.

A correction device receives a number of x-ray quanta that have a range of energies and are stored within a memory device of one of spectrum memory circuits 440, 442, 444, 446, 448, 450, 452, and 454, and divides the number by a number of x-ray quanta having the range of energies received from a memory device of spectrum memory circuit 438. For example, correction device 456 receives a number of x-ray photons having a range of energies from a memory device of spectrum memory circuit 440, and divides the number by a number of x-ray photons having the range received from a memory device of spectrum memory circuit 438. Each correction device outputs a correction output signal that represents a range of energies within x-ray quanta received by a detector element. For example, correction device 456 outputs a correction output signal 580 representing an energy spectrum or alternatively an intensity spectrum within x-ray quanta detected by detector element 40. As another example, correction device 458 outputs correction output signal 582 representing an energy spectrum within x-ray quanta detected by detector element 42. Similarly, a plurality of correction output signals 584, 586, 588, 590, 592, and 594 are generated by correction devices 460, 462, 464, 466, 468, and 470, respectively.

Processor 190 receives correction output signals 280, 282, 284, 286, 288, 290, 292, 294, 580, 582, 584, 586, 588, 590, 592, and 594 to generate a momentum transfer $x_A$, measured in inverse nanometers ($nm^{-1}$), from an energy spectrum $r(E_A)$ of energy $E_A$ of x-ray quanta within scattered radiation detected by scatter detectors 16 and 18 (FIG. 1). Processor 190 generates the momentum transfer $x_A$ by applying $$x_A = (E_A/hc)\sin(\theta/2) \qquad (1)$$

where c is a speed of light, h is Planck's constant, $\theta$ represents a constant scatter angle of x-ray quanta of scattered radiation detected by scatter detectors 16 and 18 (FIG. 1). Examples of $\theta$ include scatter angles 96 and 97 (FIG. 1). Processor 190 relates the energy $E_A$ to the momentum transfer $x_A$ by equation (1). Mechanical dimensions of secondary collimator 76 (FIG. 1) defines the scatter angle $\theta$. The secondary collimator 76 (FIG. 1) restricts scattered radiation that does not have the angle $\theta$. Processor 190 receives the scatter angle $\theta$ from a user, such as a human being, via input device 192. Processor 190 generates a diffraction profile of substance 82 (FIG. 1) by calculating a number of scatter x-ray photons that are detected by scatter detectors 16 and 18 and by plotting the number versus the momentum transfer $x_A$.

It is noted that a number of pulse-height shape amplifiers 404, 406, 408, 410, 412, 414, 416, and 418 changes with a number of scatter detector elements 40, 42, 44, 46, 48, 50, 52, and 54. For example, five pulse-height shaper amplifiers are used for amplifying signals received from five scatter detector elements. As another example, four pulse-height shaper amplifiers are used for amplifying signals received from four scatter detector elements. Similarly, a number of analog-to-digital converters 420, 422, 424, 426, 428, 430, 432, 434, and 436 changes with a number of detector elements 21, 40, 42, 44, 46, 48, 50, 52, and 54, and a number of spectrum memory circuits 438, 440, 442, 444, 446, 448, 450, 452, and 454 changes with the number of detector elements 21, 40, 42, 44, 46, 48, 50, 52, and 54.

Figure 4:
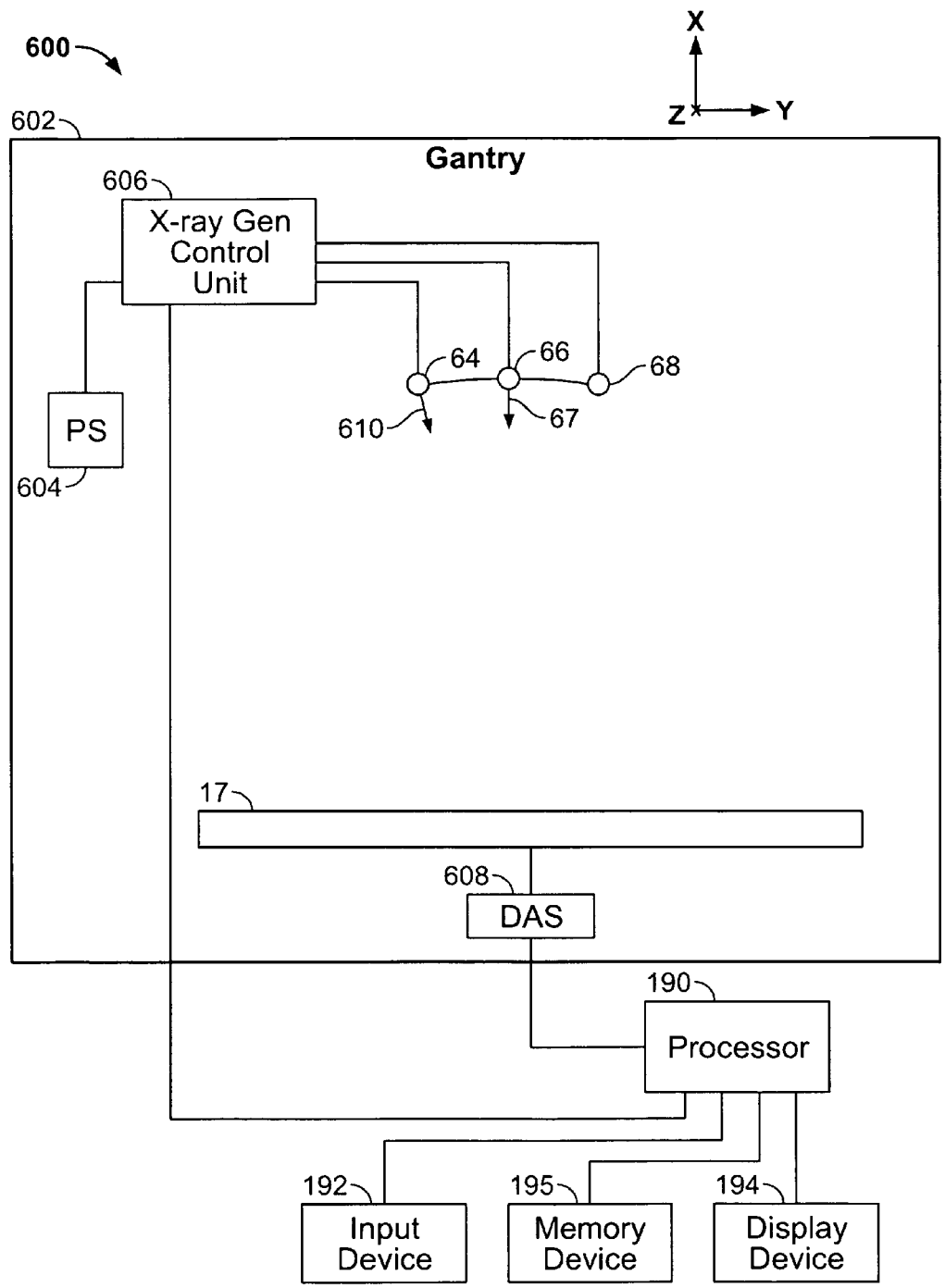
FIG. 4 is a block diagram of an embodiment of a system for generating an x-ray image.

FIG. 4 is a diagram of an embodiment of a system 600 for generating an x-ray image. System 600 includes a gantry 602, processor 190, input device 192, display device 194, and memory device 195. Gantry 602 is an example of gantry 12 (FIG. 1). Gantry 602 includes a power supply 604, an x-ray generation control unit 606, x-ray sources 64, 66, and 68, a data acquisition system (DAS) 608, and transmission detector 17. Alternatively, power supply 604 is located outside gantry 602.

X-ray generation control unit 606 includes a pulse generator (not shown) that is coupled to processor 190 and that receives power from power supply 604. Power supply 604 is coupled to x-ray sources 64, 66, and 68 to supply power to x-ray sources 64, 66, and 68.

Processor 190 issues a command, such as a first on command, a second on command, a first off command, and a second off command. Upon receiving the first on command from processor 190, the pulse generator generates a pulse and transmits the pulse to x-ray source 66. Upon receiving a pulse from the pulse generator, x-ray source 66 generates x-ray beam 67 under a potential applied by power supply 604. Similarly, upon receiving the first off command signal from processor 190, the pulse generator stops transmitting a pulse to x-ray source 66 and x-ray source 66 stops generating x-ray beam 67. Furthermore, upon receiving the second on command signal from processor 190, the pulse generator generates and transmits a pulse to any one of the remaining x-ray sources 64 and 68, and any one of the remaining x-ray sources 64 and 68 generates an x-ray beam. For example, upon receiving the second on command signal from processor 190, the pulse generator generates and transmits a pulse to x-ray source 64 and x-ray source 64 generates an x-ray beam 610. Upon receiving the second off command signal from processor 190, the pulse generator stops transmitting a pulse to any one of the remaining x-ray sources 64 and 68, and the one of the remaining x-ray sources 64 and 68 stops generating an x-ray beam.

DAS 608 samples analog data, such as electrical output signals, generated from a plurality of detector elements, including detector elements 20 and 21, of transmission detector 17 and converts the analog data to a plurality of digital signals for subsequent processing.

Figure 5:
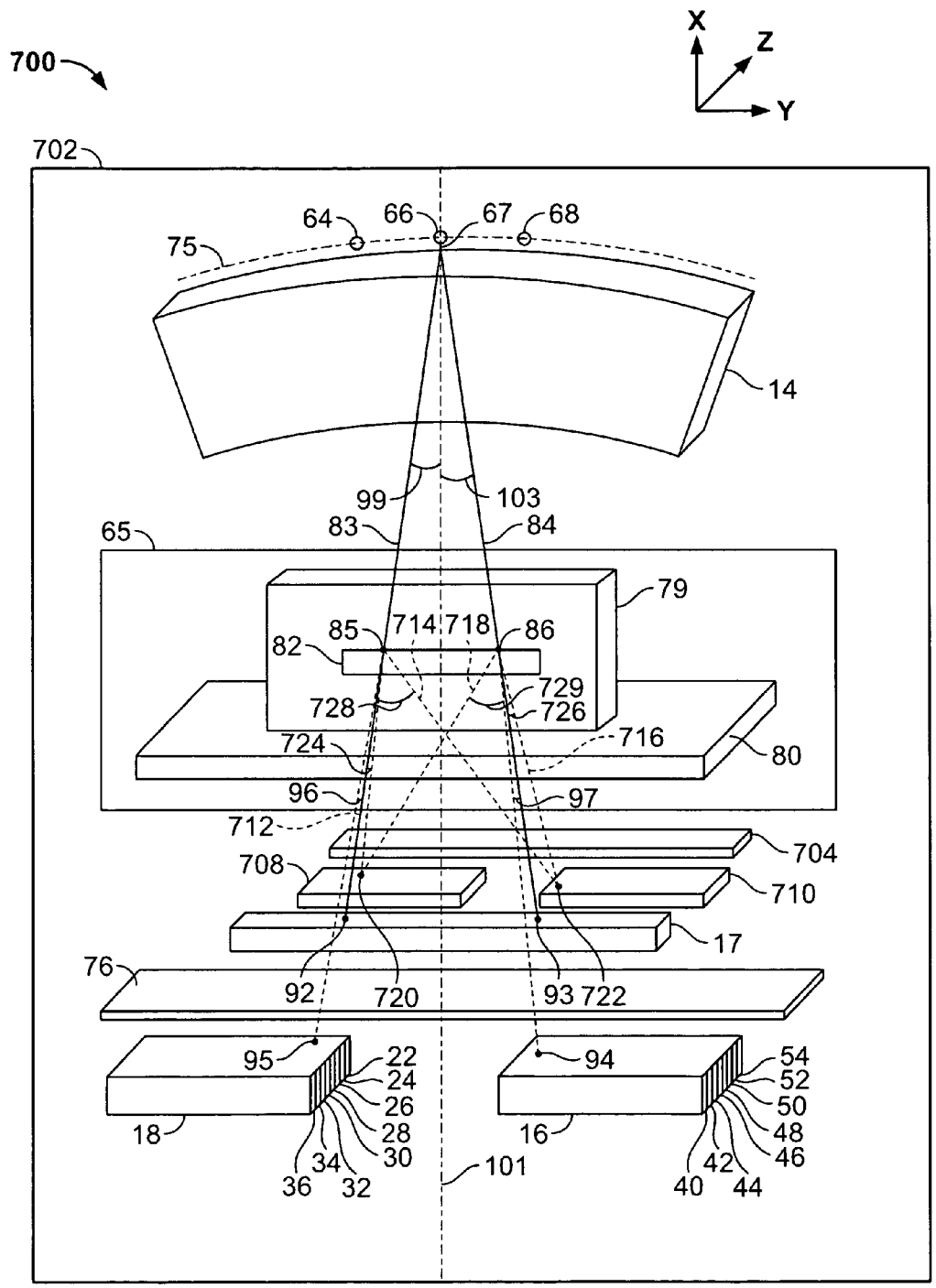
FIG. 5 is an isometric view of an alternative embodiment of a system implementing a primary collimator.

FIG. 5 is an isometric view of an alternative embodiment of a system 700 implementing a primary collimator. System 700 includes a gantry 702. Gantry 702 includes x-ray sources 64, 66, and 68, primary collimator 14, secondary collimator 76, scatter detectors 16 and 18, transmission detector 17, a secondary collimator 704, and a plurality of scatter detectors 708 and 710 that detect coherent scatter. Gantry 702 is an example of gantry 12 (FIG. 1). Secondary collimator 704 has the same structure as that of secondary collimator 76. Scatter detectors 708 and 710 are located on a side of transmission detector 17 and the side is opposite to a side where scatter detectors 16 and 18 are located. A number of scatter detectors on a side, with respect to transmission detector 17, of placement of scatter detectors 16 and 18 is the same as a number of scatter detectors on a side, with respect to transmission detector 17, of placement of scatter detectors 708 and 710. For example, if five scatter detectors are placed on one side of transmission detector 17 where scatter detectors 16 and 18 are placed, five scatter scatters are placed on the other side of transmission detector 17 where scatter detectors 708 and 710 are placed. A shortest distance between a center of scatter detector 708 and a center of scatter detector 710 is the same as shortest distance 56 between a center of scatter detector 16 and a center of scatter detector 18. Scatter detectors 708 and 710 are separated from each other by a gap. Each scatter detector 708 and 710 has the same number of detector elements as scatter detector 16. A shortest distance of transmission detector 17 from any of scatter detectors 16, 18, 708, and 710 is the same. For example, a shortest distance of transmission detector 17 from scatter detector 708 is equal to the shortest distance of transmission detector 17 from scatter detector 18.

Primary beams 83 and 84 pass through points 85 and 86 on substance 82 to generate scattered radiation 88 (FIG. 1), 89 (FIG. 1), 90 (FIG. 1), 91 (FIG. 1), 712, 714, 716, and 718. For example, primary beam 83 passes through point 85 on substance 82 to generate scattered radiation 88 (FIG. 1), 89 (FIG. 1), 712 and 714. As another example, primary beam 84 passes through point 86 on substance 82 to generate scattered radiation 90 (FIG. 1), 91 (FIG. 1), 716 and 718.

Secondary collimator 704 is located between support 80 and a set of scatter detectors 708 and 710. Secondary collimator 704 includes a number of collimator elements to ensure that scattered radiation arriving at scatter detectors 708 and 710 have constant scatter angles with respect to primary beams 83 and 84 and that a position of scatter detectors 708 and 710 permits a depth in container 79 at which the scattered radiation originated to be determined. For example, the collimator elements of secondary collimator 704 are arranged parallel to a direction of scattered radiation 712 and of scattered radiation 716 to absorb scattered radiation that is not parallel to the direction of scattered radiation 712 and of scattered radiation 716.

The number of collimator elements in secondary collimator 704 provided is equal to or alternatively greater than a number of detector elements of one of scatter detectors 708 and 710 and the collimator elements are arranged such that scattered radiation between neighboring collimator elements is incident on one of the detector elements. The collimator elements of scatter detectors 708 and 710 are made of a radiation-absorbing material, such as, a copper alloy or a silver alloy.

Underneath support 80, there are arranged scatter detectors 708 and 710 that measure photon energies of scattered radiation detected by scatter detectors 708 and 710. Scatter detectors 16, 18, transmission detector 17, and scatter detectors 708 and 710 lie in the same yz plane. Each of scatter detectors 708 and 710 measures the x-ray photons within scattered radiation in an energy-sensitive manner by outputting a plurality of electrical output signals linearly dependent on a plurality of energies of the x-ray photons detected from within scattered radiation. Scatter detector 708 measures scattered radiation 712 received at a point 720 on scatter detector 708 and scatter detector 710 measures scattered radiation 716 received at a point 722 on scatter detector 710. An example of a shortest distance between points 85 and 720 includes a distance ranging from and including 900 mm to 1100 mm. An example of a distance between points 720 and 92 includes a distance ranging from and including 25 mm to 45 mm.

Scatter detectors 708 and 710 detect scattered radiation to generate a plurality of electrical output signals. Scatter detector 708 detects scattered radiation 712 generated upon intersection of primary beam 83 with point 85. Moreover, scatter detector 708 detects at least a portion of scattered radiation 718 generated upon intersection of primary beam 84 with point 86. Scatter detector 710 detects scattered radiation 716 generated upon intersection of primary beam 84 with point 86. Moreover, scatter detector 710 detects at least a portion of scattered radiation 714 generated upon intersection of primary beam 83 with point 85. A scatter angle 724 formed between primary beam 83 and scattered radiation 712 is equal to a scatter angle 726 formed between primary beam 84 and scattered radiation 716. An example of each of scatter angles 724 and 726 includes an angle ranging from and including 0.025 radians to 0.045 radians. An example of a scatter angle 728 formed between primary beam 83 and scattered radiation 714 ranges from and including 0.05 radians to 0.09 radians.

Moreover, an example of a scatter angle 729 formed between primary beam 84 and scattered radiation 718 ranges from and including 0.05 radians to 0.09 radians. Scatter angle 728 is at least twice of any of scatter angles 724 and 726 and scatter angle 729 is at least twice of any of scatter angles 724 and 726. Angle 99 formed by primary beam 83 with respect to center 101 between scatter detectors 708 and 710 is equal to angle 103 formed by primary beam 84 with respect to center 101. In an alternative embodiment, system 700 does not include secondary collimators 76 and 704.

Scatter detector 708 is connected to a system similar to system 100 (FIG. 2) to generate a plurality of correction output signals, such as correction output signals 280, 282, 284, 286, 288, 290, 292, and 294 (FIG. 2). Moreover, scatter detector 710 is connected to a system similar to system 400 (FIG. 3) to generate a plurality of correction output signals, such as correction output signals 580, 582, 584, 586, 588, 590, 592, and 594 (FIG. 3). Processor 190 receives correction output signals 280, 282, 284, 286, 288, 290, 292, 294, 580, 582, 584, 586, 588, 590, 592, and 594 (FIGS. 2 and 3), the correction output signals generated by the system that is similar to system 100 (FIG. 2) and that is connected to scatter detector 708, and the correction output signals generated by the system that is similar to system 400 (FIG. 3) and that is connected to scatter detector 710, to generate a momentum transfer $x_B$.

Processor 190 generates the momentum transfer $x_B$, measured in $nm^{-1}$, from an energy spectrum $r(E_B)$ of energy $E_B$ of x-ray quanta within scattered radiation detected by scatter detectors 16, 18, 708, and 710. Processor 190 generates the momentum transfer $x_B$ by applying $$x_B = (E_B/hc)\sin(\theta/2) \quad (2)$$

where $\theta$ represents a constant scatter angle of x-ray quanta of scattered radiation detected by scatter detectors 16, 18, 708, and 710. Examples of $\theta$ include scatter angles 96 (FIG. 1), 97 (FIG. 1), 724, and 726. Processor 190 relates the energy $E_B$ to the momentum transfer $x_B$ by equation (2). The secondary collimators 76 (FIG. 1) and 704 restrict scattered radiation that does not have the angle $\theta$. Processor 190 generates a diffraction profile of substance 82 by calculating a number of scatter x-ray photons that are detected by scatter detectors 16, 18, 708 and 710, and by plotting the number versus the momentum transfer $x_B$.

Figure 6:
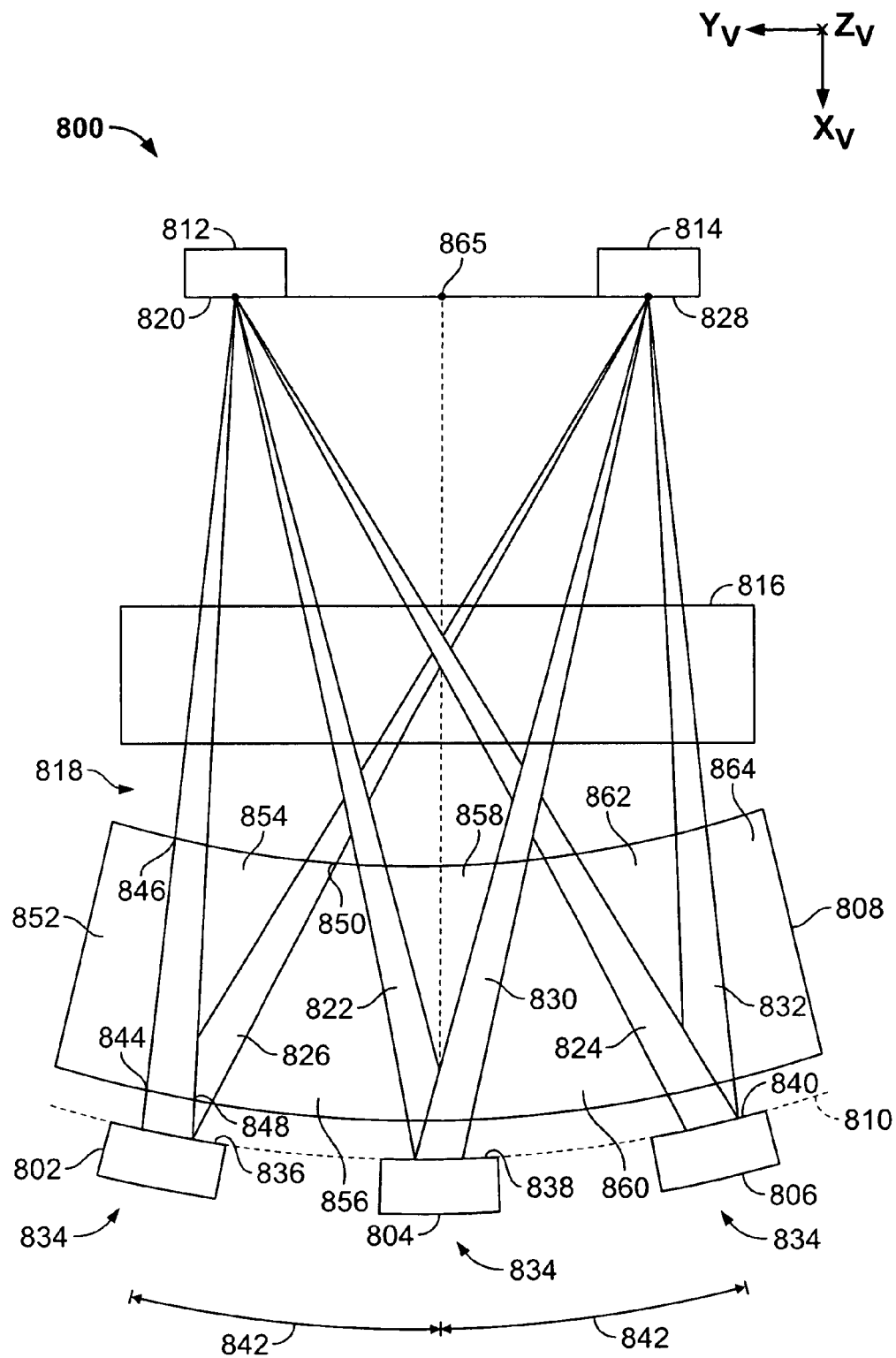
FIG. 6 is a diagram of illustrating an embodiment of a virtual system for developing a primary collimator.

FIG. 6 is a diagram of illustrating an embodiment of a virtual system 800 for developing a primary collimator. Processor 190 generates virtual system 800. For example, processor 190 generates virtual system 800 to display virtual system 800 on display device 194 (FIG. 2). Virtual system 800 includes a plurality of virtual x-ray sources 802, 804, and 806, a virtual primary collimator block 808, and a plurality of virtual detectors 812 and 814, such as virtual transmission detectors. Processor 190 generates virtual x-ray sources 802, 804, and 806 as a virtual representation of x-ray sources 68, 66, and 64 (FIG. 1), respectively, and locates virtual x-ray sources 802, 804, and 806 along a curve 810. For example, processor 190 generates virtual x-ray source 802 as a representation of x-ray source 68, generates virtual x-ray source 804 as a representation of x-ray source 66, and generates virtual x-ray source 806 as a representation of x-ray source 64. Curve 810 is a virtual representation of arc 75. In an alternative embodiment, processor 190 generates any number, such as two, four, or five, virtual x-ray sources. For example, processor 190 generates virtual x-ray sources 802 and 804. Moreover, processor 190 generates virtual detector 812 as a virtual representation of a transmission detector, such as transmission detector 17 (FIG. 1). Processor 190 generates the remaining virtual detector 814 as a virtual representation of a transmission detector, such as transmission detector 17. Processor 190 generates a virtual opening 816 as a virtual representation of opening 65 (FIG. 1).

The user provides an organization of the components of system 10 (FIG. 1) to processor 190 via input device 192 (FIG. 2). The user inputs, via input device 192, a plurality of distances between the components of system 10 and provides the organization of the components of system 10 to processor 190 by providing the distances to processor 190 via input device 192. For example, the user specifies a number of detector elements within transmission detector 17, a radius of arc 75, a plurality of positions of x-ray sources 64, 66, and 68 with respect to opening 65, a distance between any two of x-ray sources 64, 66, and 68, and a position of opening 65 with respect to at least one of transmission detector 17, scatter detector 16, and scatter detector 18, x-ray source 64, x-ray source 66, and x-ray source 68.

Processor 190 organizes the virtual elements of virtual system 800 and the organization is proportional, by a first factor, such as one-half or one-third, to the organization of the components of system 10 input by the user. For example, processor 190 generates any two of adjacent ones of virtual x-ray sources 802, 804, and 806, and a distance between the two adjacent ones of virtual x-ray sources 802, 804, and 806 is proportional, such as one-half or one-third, to a distance between any two adjacent ones of x-ray sources 64, 66, and 68. As another example, processor 190 generates virtual opening 816 and a distance between virtual opening 816 and virtual x-ray source 804 is proportional to a distance between x-ray source 66 and opening 65. Virtual detectors 812 and 814 are located in the same $y_v z_v$ plane formed by a $z_v$ axis and a $y_v$ axis. The $z_v$ axis is perpendicular to the $y_v$ axis, which is perpendicular to an $x_v$ axis, and the $z_v$ axis is perpendicular to the $x_v$ axis.

Processor 190 generates virtual primary collimator block 808 between virtual opening 816 and virtual x-ray sources 802, 804, and 806. In an alternative embodiment, processor 190 places virtual primary collimator block 808 adjacent to virtual x-ray sources 802, 804, and 806. Processor 190 extends a virtual beam or a virtual collimator channel 818 from virtual x-ray source 802 to a focus of virtual collimator channel 818 at a center of a surface 820 of virtual detector 812. Similarly, processor 190 extends a plurality of virtual beams or a plurality of virtual collimator channels 822 and 824 from virtual x-ray sources 804 and 806. For example, processor extends virtual collimator channel 822 from virtual x-ray source 804 to the focus of virtual collimator channel 822 at the center of surface 820 of virtual detector 812 and extends virtual collimator channel 824 from virtual x-ray source 806 to the focus of virtual collimator channel 824 at the center of surface 820 of virtual detector 812.

Moreover, processor 190 extends a virtual beam or a virtual collimator channel 826 from virtual x-ray source 802 to focus virtual collimator channel 826 at a center of a surface 828 of virtual detector 814. Similarly, processor 190 extends a plurality of virtual beams or a plurality of virtual collimator channels 830 and 832 from virtual x-ray sources 804 and 806. For example, processor extends virtual collimator channel 830 from virtual x-ray source 804 to the focus of virtual collimator channel at the center of surface 828 of virtual detector 814 and extends virtual collimator channel 832 from virtual x-ray source 806 to the focus of virtual collimator channel at the center of surface 828 of virtual detector 814.

Processor 190 extends each virtual collimator channel 818, 822, 824, 826, 830, and 832 having a width 834 measured along and coincident with curve 810. For example, processor 190 extends virtual collimator channel 818 having width 834 along and at curve 810. A distance 842, coincident with curve 810, between a center of a surface 836 of virtual x-ray source 802 and a center of a surface 838 of virtual x-ray source 804 is equal to distance 842 between a center of a surface 840 of virtual x-ray source 806 and the center of surface 838 of virtual x-ray source 804. Processor 190 generates virtual collimator channels 818, 822, 824, 826, 830, and 832 having width 834, coincident with curve 810, and width 834 is at most equal to a ratio of distance 842 and a number of virtual detectors 812 and 814. Processor 190 generates a virtual collimator channel extending equal distances from a center of a virtual x-ray source. For example, processor 190 extends virtual collimator channel 818 for a distance equal to half of width 834 in a first direction coincident with curve 810 and for a distance equal to half of width 834 in a second direction coincident with curve 810. The first direction is opposite to the second direction. For example, the first direction is clockwise and the second direction is counterclockwise. As another example, the second direction is clockwise and the first direction is counterclockwise.

Processor 190 determines a plurality of virtual sizes of virtual collimator channels 818, 822, 824, 826, 830, and 832. For example, processor 190 determines a distance between a point 844 of virtual collimator channel 818 and another point 846 of virtual collimator channel 818. As another example, processor 190 determines a distance between point 844 and a point 848 of virtual collimator channel 818. As yet another example, processor 190 determines a distance, along curve 810, between a point 850 of virtual collimator channel 826 and point 848 of virtual collimator channel 818. Point 844 of virtual collimator channel 818 is a point of incidence of virtual collimator channel 818 extending from virtual x-ray source 802 on virtual primary collimator block 808. Moreover, point 848 of virtual collimator channel 818 is a point of incidence of virtual collimator channel 818 extending from virtual x-ray source 802 on virtual primary collimator block 808. Point 846 of virtual collimator channel 818 is a point of exit of virtual collimator channel 818 from virtual primary collimator block 808. Furthermore, point 850 of virtual collimator channel 826 is a point of exit of virtual collimator channel 826 from virtual primary collimator block 808. The distances between point 844 and point 846, point 844 and point 848, and point 848 and point 850 are examples of the virtual sizes.

Processor 190 creates a virtual channel section wall 852 of virtual primary collimator block 808 and a virtual channel section wall 854 of virtual primary collimator block 808 upon creating virtual collimator channel 818. Virtual collimator channel 818 is located between virtual channel section wall 852 and virtual channel section wall 854. Similarly, processor 190 creates a virtual channel section wall 856 of virtual primary collimator block 808 and virtual channel section wall 854 upon creating virtual collimator channel 826, creates a virtual channel section wall 858 of virtual primary collimator block 808 and virtual channel section wall 856 upon creating virtual collimator channel 822, creates a virtual channel section wall 860 of virtual primary collimator block 808 and virtual channel section wall 858 upon creating virtual collimator channel 830, creates a virtual channel section wall 862 of virtual primary collimator block 808 and virtual channel section wall 860 upon creating virtual collimator channel 824, and creates a virtual channel section wall 864 of virtual primary collimator block 808 and virtual channel section wall 862 upon creating virtual collimator channel 832. Virtual collimator channel 826 is located between virtual channel section wall 854 and virtual channel section wall 856, virtual collimator channel 822 is located between virtual channel section wall 856 and virtual channel section wall 858, virtual collimator channel 830 is located between virtual channel section wall 858 and virtual channel section wall 860, virtual collimator channel 824 is located between virtual channel section wall 860 and virtual channel section wall 862, and virtual collimator channel 832 is located between virtual channel section wall 862 and virtual channel section wall 864. When virtual primary collimator block 808 is adjacent to virtual x-ray sources 802, 804, and 806, a width, measured coincident with curve 810, of virtual channel section wall 856 is equal to a difference between distance 842 and width 834, and a width, measured coincident with curve 810, of virtual channel section wall 860 is equal to a difference between distance 842 and width 834. A point 865 is a center of a circle including curve 810.

Figure 7:
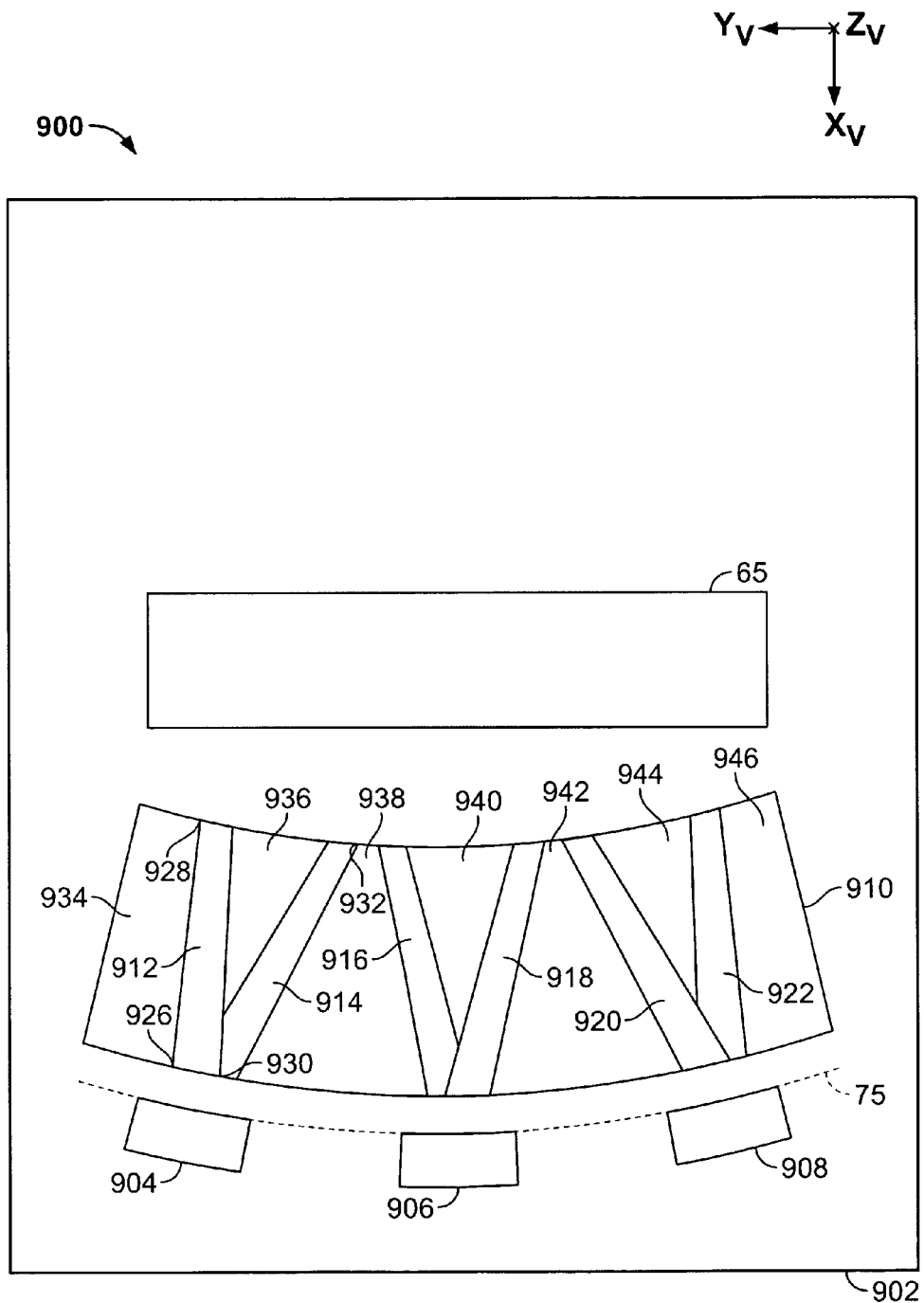
FIG. 7 is a diagram of an embodiment of a system implementing a primary collimator.
Figure 8:
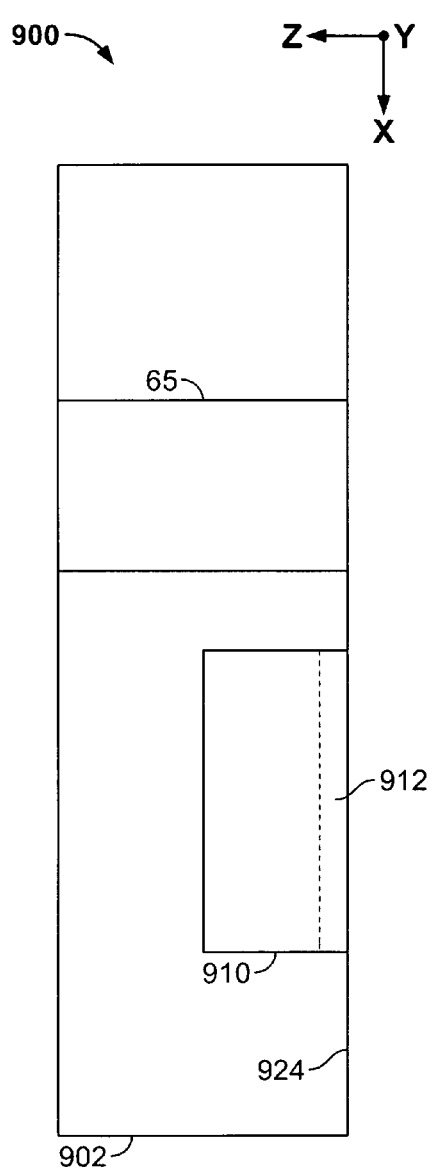
FIG. 8 is a side view of an embodiment of the system of FIG. 7.
Figure 9:
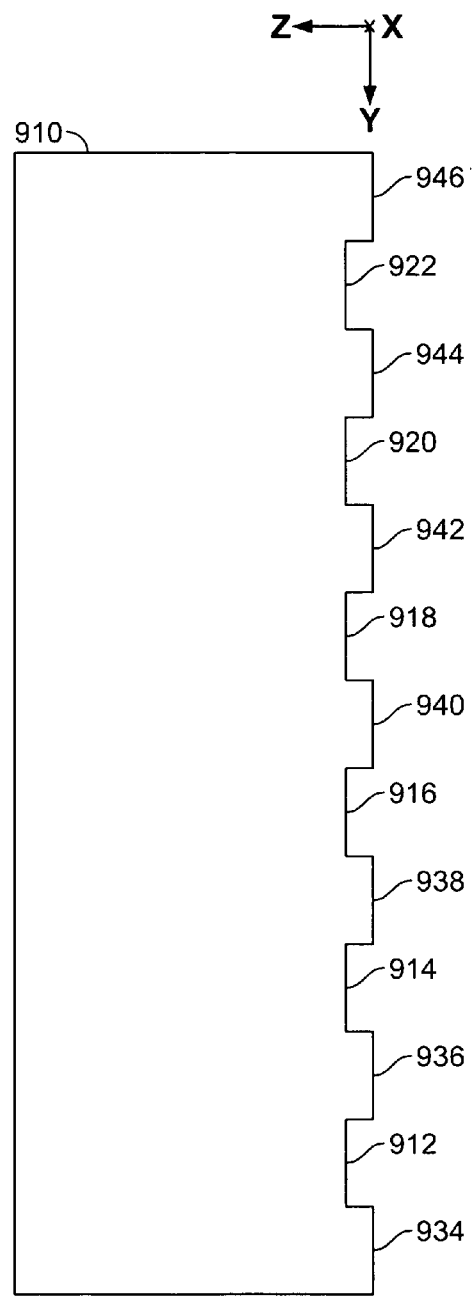
FIG. 9 is a top view of an embodiment of a primary collimator.

FIG. 7 is a diagram of an embodiment of a system 900 implementing a primary collimator and FIG. 8 is a side view of an embodiment of the system 900, and FIG. 9 is a top view of the primary collimator. System 900 is an example of system 10 (FIG. 1) and of system 600 (FIG. 4). Alternatively, system 900 is an example of system 700 (FIG. 5) and of system 600. System 900 includes a gantry 902, which is an example of gantry 12. Gantry 902 includes opening 65, a plurality of x-ray sources 904, 906, and 908, a primary collimator block 910 including a plurality of collimator channels 912, 914, 916, 918, 920, and 922, and a plurality of channel section walls 934, 936, 938, 940, 942, 944, and 946. Primary collimator block 910 is fabricated from a material, such as molybdenum, tungsten, steel, or brass. Primary collimator block 910 is located between x-ray sources 904, 906, and 908 and opening 65, and is an example of primary collimator 14 (FIG. 1). As an example, primary collimator block 910 has a length ranging from and including 1.4 meters (m) to 1.6 meters in a direction parallel to arc 75, a height ranging from and including 200 mm to 300 mm in the in the x-direction, and a thickness ranging from and including 10 mm to 20 mm in the z-direction. X-ray source 904 is an example of x-ray source 68, x-ray source 906 is an example of x-ray source 66, and x-ray source 908 is an example of x-ray source 64.

Primary collimator block 910 is attached by a connection process, such as gluing or spot welding, to a wall 924 of gantry 902. Alternatively, primary collimator block 910 is attached to wall 924 by fitting primary collimator block 910 to wall 924 via a plurality of screws.

Processor 190 calculates a plurality of real sizes of collimator channels 912, 914, 916, 918, 920, and 922 as being proportional, by a second factor, such as two or three, to the virtual sizes of virtual collimator channels 818, 826, 822, 830, 824, and 832. For example, processor 190 determines that a distance between a point 926 of collimator channel 912 and a point 928 of collimator channel 912 is proportional, by the second factor, to a distance between points 844 and 846. As another example, processor 190 determines that a distance between point 926 and a point 930 of collimator channel 912 is proportional, by the second factor, to the distance between points 844 and 848. As yet another example, processor 190 determines that a distance between point 930 and a point 932 of collimator channel 914 is proportional, by the second factor, to the distance between points 848 and 850. Moreover, the user inputs, via input device 192, to processor 190 a depth, parallel to the z-axis, of each collimator channel 912, 914, 916, 918, 920, and 922. As an example, a depth, along the z-axis, of each collimator channel 912, 914, 916, 918, 920, and 922 ranges from and including 100 microns to 1 mm. A depth, along the z-axis, of each collimator channel 912, 914, 916, 918, 920, and 922, the distance between points 926 and 928, the distance between points 926 and 930, and the distance between points 930 and 932 are examples of the real sizes.

The user fabricates collimator channels 912, 914, 916, 918, 920, and 922 within primary collimator block 910 by applying photolithography and/or by using at least one of a plurality of devices, such as a numerically-controlled milling machine, a spark erosion device, a molding machine, and a circular rotating diamond saw. As an example, the user places a tungsten wire at positions of collimator channels 912, 914, 916, 918, 920, and 922 and erodes primary collimator material, at the positions, of primary collimator block 910. As another example, the user pours a liquid material, such as steel or brass, in a molding machines having a plurality of peaks having the real sizes of collimator channels 912, 914, 916, 918, 920, and 922, and cools the liquid material to create collimator channels 912, 914, 916, 918, 920, and 922 within primary collimator block 910. As yet another example, the user inputs the real sizes of collimator channels 912, 914, 916, 918, 920, and 922 into a processor, such as processor 190, and the processor controls a milling machine having teeth that reciprocate, along at least one of the x, y, and z-axes, to remove primary material from a primary collimator block 910 to create the real sizes of collimator channels 912, 914, 916, 918, 920, and 922. As still another example, the user uses a measuring tape and a circular rotating diamond saw to remove primary collimator material from a primary collimator block 910 to generate the real sizes of primary collimator block 910. As another example, the user etches collimator channels 912, 914, 916, 918, 920, and 922 by applying photolithography.

The user fabricates collimator channel 912 to fabricate channel section walls 934 and 936, fabricates collimator channel 914 to fabricate channel section walls 936 and 938, fabricates collimator channel 916 to fabricate channel section walls 938 and 940, fabricates collimator channel 918 to fabricate channel section walls 940 and 942, fabricates collimator channel 920 to fabricate channel section walls 942 and 944, and fabricates collimator channel 922 to fabricate channel section walls 944 and 946. Virtual collimator channel 818 is a virtual representation of collimator channel 912, virtual collimator channel 826 is a virtual representation of collimator channel 914, virtual collimator channel 822 is a virtual representation of collimator channel 916, virtual collimator channel 830 is a virtual representation of collimator channel 918, virtual collimator channel 824 is a virtual representation of collimator channel 920, and virtual collimator channel 832 is a virtual representation of collimator channel 922. Moreover, virtual primary collimator block 808 is a virtual representation of primary collimator block 910. Furthermore, virtual channel section wall 852 is a virtual representation of channel section wall 934, virtual channel section wall 854 is a virtual representation of channel section wall 936, virtual channel section wall 856 is a virtual representation of channel section wall 938, virtual channel section wall 858 is a virtual representation of channel section wall 940, virtual channel section wall 860 is a virtual representation of channel section wall 942, virtual channel section wall 862 is a virtual representation of channel section wall 944, and virtual channel section wall 864 is a virtual representation of channel section wall 946.

Collimator channel 912 is formed between channel section wall 934 and channel section wall 936, collimator channel 914 is formed between channel section wall 936 and channel section wall 938, collimator channel 916 is formed between channel section wall 938 and channel section wall 940, collimator channel 918 is formed between channel section wall 940 and channel section wall 942, collimator channel 920 is formed between channel section wall 942 and channel section wall 944, and collimator channel 922 is formed between channel section wall 944 and channel section wall 946. Channel section wall 934 is proportional, by the second factor, to virtual channel section wall 852. Similarly, channel section wall 936 is proportional, by the second factor, to virtual channel section wall 854, channel section wall 938 is proportional, by the second factor, to virtual channel section wall 856, channel section wall 940 is proportional, by the second factor, to virtual channel section wall 858, channel section wall 942 is proportional, by the second factor, to virtual channel section wall 860, channel section wall 944 is proportional, by the second factor, to virtual channel section wall 862, and channel section wall 946 is proportional, by the second factor, to virtual channel section wall 864. Moreover, each collimator channel of primary collimator block 910 is proportional, by the second factor, to a respective collimator channel of virtual primary collimator block 808. For example, a size collimator channel 912 is proportional, by the second factor, to a size of virtual collimator channel 818. As another example, a size collimator channel 916 is proportional, by the second factor, to a size of virtual collimator channel 822.

When x-ray sources 904, 906, and 908 generate a plurality of x-ray beams, the x-ray beams pass through collimator channels 912, 914, 916, 918, 920, and 922 of primary collimator block 910 and primary collimator block 910 outputs a plurality of primary beams. For example, x-ray source 66 generates x-ray beam 67 that passes through collimator channels 916 and 918 of primary collimator block 910 and primary collimator block 910 outputs primary beams 83 and 84. Primary beam 83 is output from collimator channel 918 and primary beam 84 is output from collimator channel 916.

Figure 10:
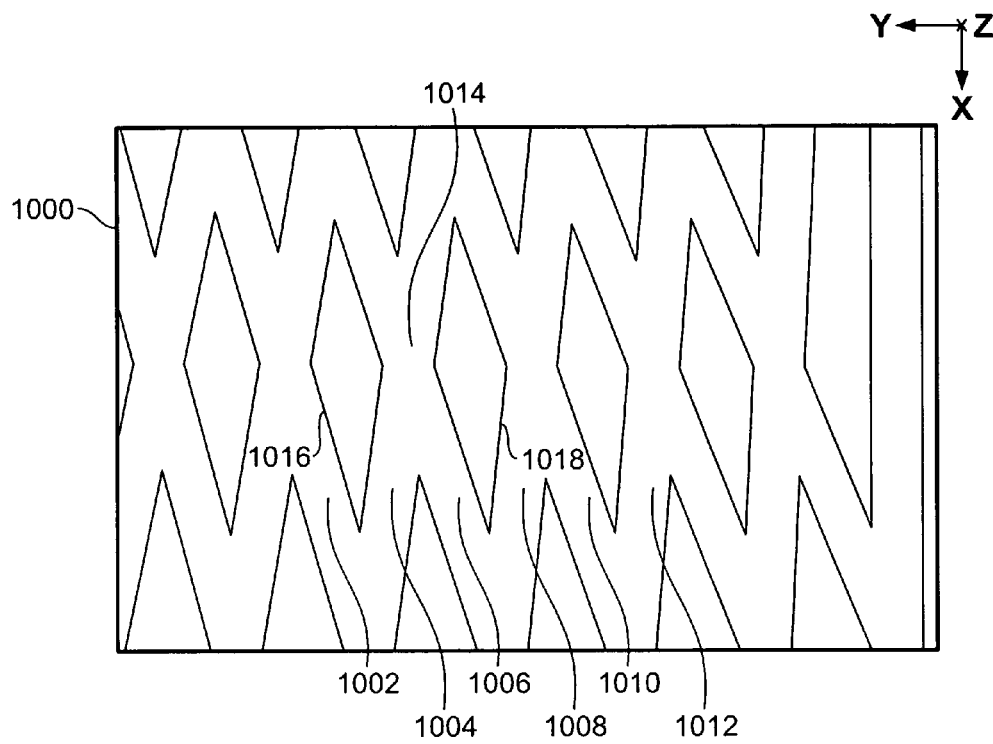
FIG. 10 shows an embodiment of a primary collimator block including a plurality of collimator channels.

FIG. 10 shows a diagram of an embodiment of a primary collimator block 1000 including a plurality of collimator channels 1002, 1004, 1006, 1108, 1010, and 1012, and a plurality of channel section walls including channel section walls 1016 and 1018. Primary collimator block 1000 extends from and including 40 mm to 60 mm in the y-direction and from and including 250 mm to 300 mm in the x-direction. Primary collimator block 1000 is formed by extending a plurality of virtual beams or a plurality of virtual collimator channels from a plurality of virtual x-ray sources 802, 804, and 806 towards a couple of foci. Collimator channel 1002 is an example of collimator channel 912, collimator channel 1004 is an example of collimator channel 914, collimator channel 1006 is an example of collimator channel 916, collimator channel 1008 is an example of collimator channel 918, collimator channel 1010 is an example of collimator channel 920, and collimator channel 1012 is an example of collimator channel 922. A space 1014 is formed between two adjacent channel section walls, such as channel section walls 1016 and 1018, and two beams including x-ray beam 67 within collimator channel 1006 and a second beam within collimator channel 1004, cross each other within space 1014. A virtual representation, such as virtual collimator channel 822, of x-ray beam 67 is focused towards virtual detector 812. A virtual representation, such as virtual collimator channel 826, of the second beam is emitted by virtual x-ray source 802 and is focused towards virtual detector 814.

Figure 11:
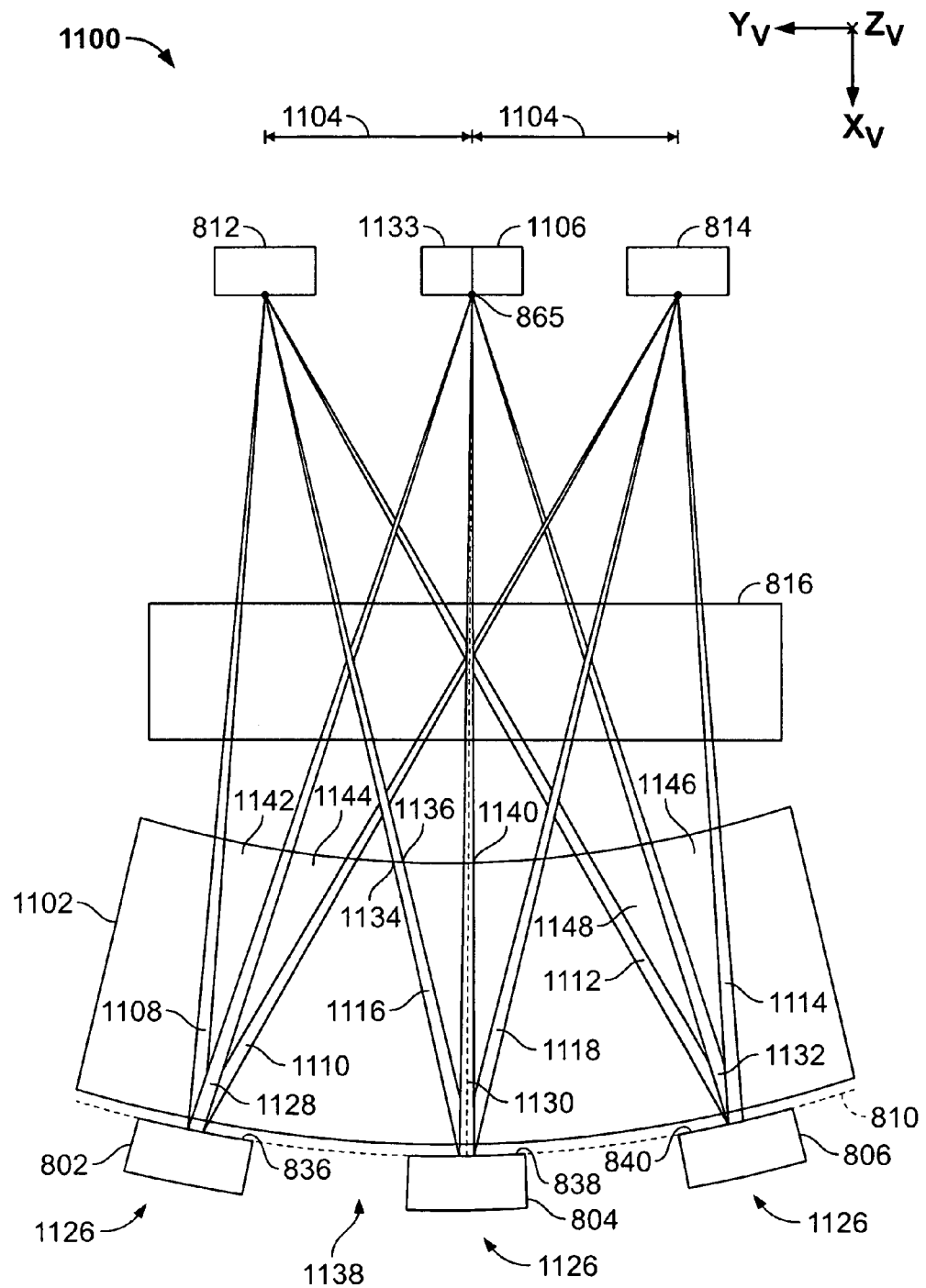
FIG. 11 is a diagram of an alternative embodiment of a virtual system for developing a primary collimator.

FIG. 11 is a diagram of an alternative embodiment of a virtual system 1100 for developing a primary collimator. Processor 190 generates a virtual primary collimator block 1102 between virtual x-ray sources 802, 804, and 806 and virtual opening 816. Processor 190 generates a virtual detector 1106 and a distance 1104, along the $y_v$ axis, between a center of virtual detector 812 and a center of virtual detector 1106 is equal to distance 1104, along the $y_v$-axis, between the center of virtual detector 1106 and a center of virtual detector 814.

Processor 190 extends a plurality of virtual collimator channels 1108, 1110, 1112, 1114, 1116, and 1118 from virtual x-ray sources 802, 804, and 806 in a similar manner to that of extending virtual collimator channels 818, 826, 824, 832, 822, and 830 from virtual x-ray sources 802, 804, and 806 except that each virtual collimator channel 1108, 1110, 1112, 1114, 1116, and 1118 has a width 1126, coincident with curve 810, different than width 834. For example, processor 190 generates virtual collimator channels 1108, 1110, 1112, 1114, 1116, and 1118 having width 834, coincident with curve 810, at most equal to a ratio of distance 842 and a number of virtual detectors, 812, 814, and 1106. In an alternative embodiment, processor 190 places virtual primary collimator block 1102 adjacent to virtual x-ray sources 802, 804, and 806.

Processor 190 extends a plurality of virtual collimator channels 1128, 1130, and 1132 from virtual x-ray sources 802, 804, and 806 to a focus of virtual detector 1106. For example, processor 190 extends virtual collimator channel 1128 from virtual x-ray source 802 to a center of a surface 1133 of virtual detector 1106, extends virtual collimator channel 1130 from virtual x-ray source 804 to the center of surface 1133 of virtual detector 1106, and extends virtual collimator channel 1132 from virtual x-ray source 806 to the center of surface 1133 of virtual detector 1106. Processor 190 generates virtual collimator channel 1128 having the same width 1126, coincident with curve 810, as that of width 1126, coincident with curve 810, of each of virtual collimator channels 1108, 1110, 1112, 1114, 1116, and 1118. Moreover, processor 190 generates virtual collimator channel 1130 having the same width 1126, coincident with curve 810, as that of width 1126, coincident with curve 810, of each of virtual collimator channels 1108, 1110, 1112, 1114, 1116, and 1118 and generates virtual collimator channel 1132 having the same width 1126, coincident with curve 810, as that of width 1126, coincident with curve 810, of each of virtual collimator channels 1108, 1110, 1112, 1114, 1116, and 1118.

Processor 190 creates a virtual channel section wall 1142 of virtual primary collimator block 1102 and a virtual channel section wall 1144 of virtual primary collimator block 1102 by creating virtual collimator channel 1128. Virtual collimator channel 1128 is located between virtual channel section wall 1142 and virtual channel section wall 1144. Similarly, processor 190 creates a first virtual channel section wall of virtual primary collimator block 1102 and a second virtual channel section wall by creating any one of the remaining virtual collimator channels 1108, 1110, 1116, 1130, 1118, 1112, 1132, and 1114 between the first and second virtual channel section walls. For example, processor 190 creates a virtual channel section wall 1146 of virtual primary collimator block 1102 and a virtual channel section wall 1148 of virtual primary collimator block 1102 by creating virtual collimator channel 1132 between the virtual channel section walls 1146 and 1148.

It is noted that in an alternative embodiment, processor 190 generates any number, such as ranging from and including 4 to 10, of virtual detectors in the same $y_v z_v$ plane as that of virtual detectors 812, 814, and 1106. The $y_v z_v$ plane is formed by the $y_v$ axis and the $z_v$ axis. Processor 190 determines a plurality of virtual dimensions of virtual collimator channels 1108, 1110, 1112, 1114, 1116, 1118, 1128, 1130, and 1132. For example, processor 190 calculates a distance between a point 1134 and a point 1136, and a distance between point 1134 and a point 1138. Point 1134 is a point of exit of virtual collimator channel 1116 from virtual primary collimator block 1102. Point 1136 is a point of exit of virtual collimator channel 1116 from virtual primary collimator block 1102, and point 1138 is a point of incidence of virtual collimator channel 1116 on virtual primary collimator block 1102. As another example, processor 190 calculates a distance between point 1138 and a point 1140. Point 1140 is a point of exit of virtual collimator channel 1130 from virtual primary collimator block 1102.

Figure 12:
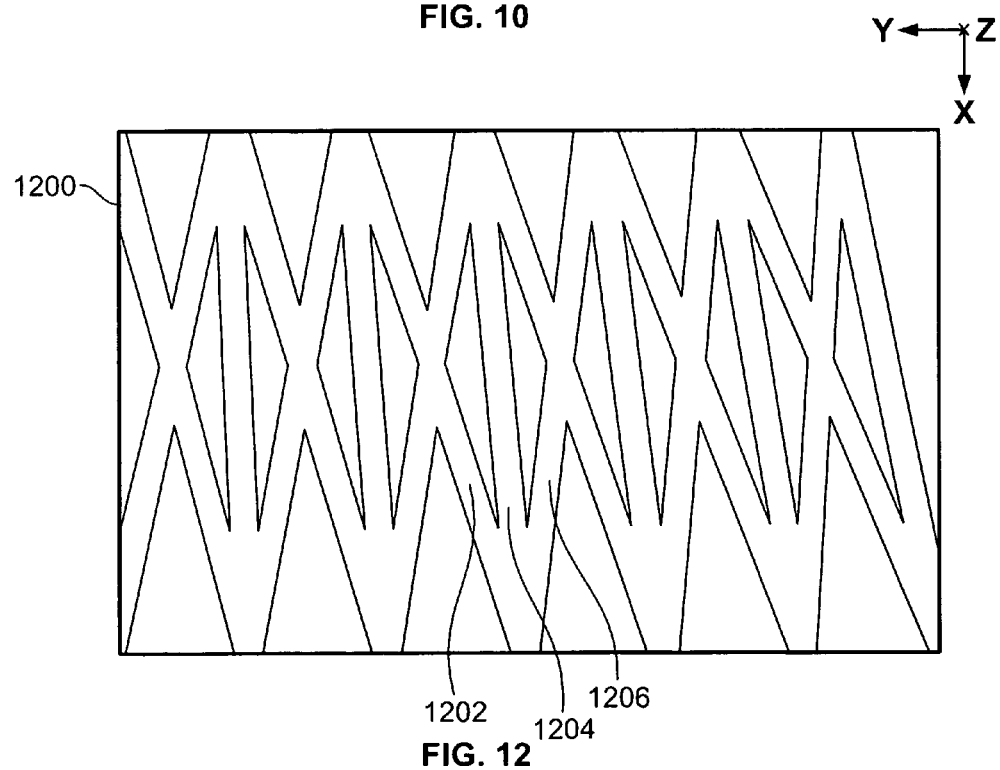
FIG. 12 is a diagram of an alternative embodiment of a primary collimator block including a plurality of collimator channels.

FIG. 12 is a diagram of an embodiment of a primary collimator block 1200 including a plurality of collimator channels 1202, 1204, and 1206. Primary collimator block 1200 is placed in system 10 in place of primary collimator 14. Primary collimator block 1200 extends from and including 40 mm to 60 mm in the y-direction and from and including 250 mm to 300 mm in the x-direction. As an example, a depth, along the z-axis, of each collimator channel, including collimator channels 1202, 1204, and 1206, of primary collimator block 1200 ranges from and including 100 microns to 1 mm. Moreover, as an example, primary collimator block 1200 has a thickness ranging from and including 10 mm to 20 mm in the z-direction. The user fabricates primary collimator block 1200 based on a size of virtual primary collimator block 1102. For example, the user uses a numerically-controlled milling machine to fabricate collimator channel 1202 that has a size, proportional by the second factor, to the virtual dimensions of virtual collimator channel 1116 (FIG. 11). As another example, the user uses a molding machine to mold collimator channel 1204 that has a size that is twice of the virtual dimensions of virtual collimator channel 1130 (FIG. 11). As yet another example, the user uses a molding to mold collimator channel 1206 that has a size, proportional by the second factor, to the virtual dimensions of virtual collimator channel 1118. Primary collimator block 1200 receives x-ray beam 67 to output three primary beams. For example, a first one of the three primary beams is output from collimator channel 1202, a second one of the three primary beams is output from collimator channel 1204, and a third one of the three primary beams is output from collimator channel 1206.

Figure 13:
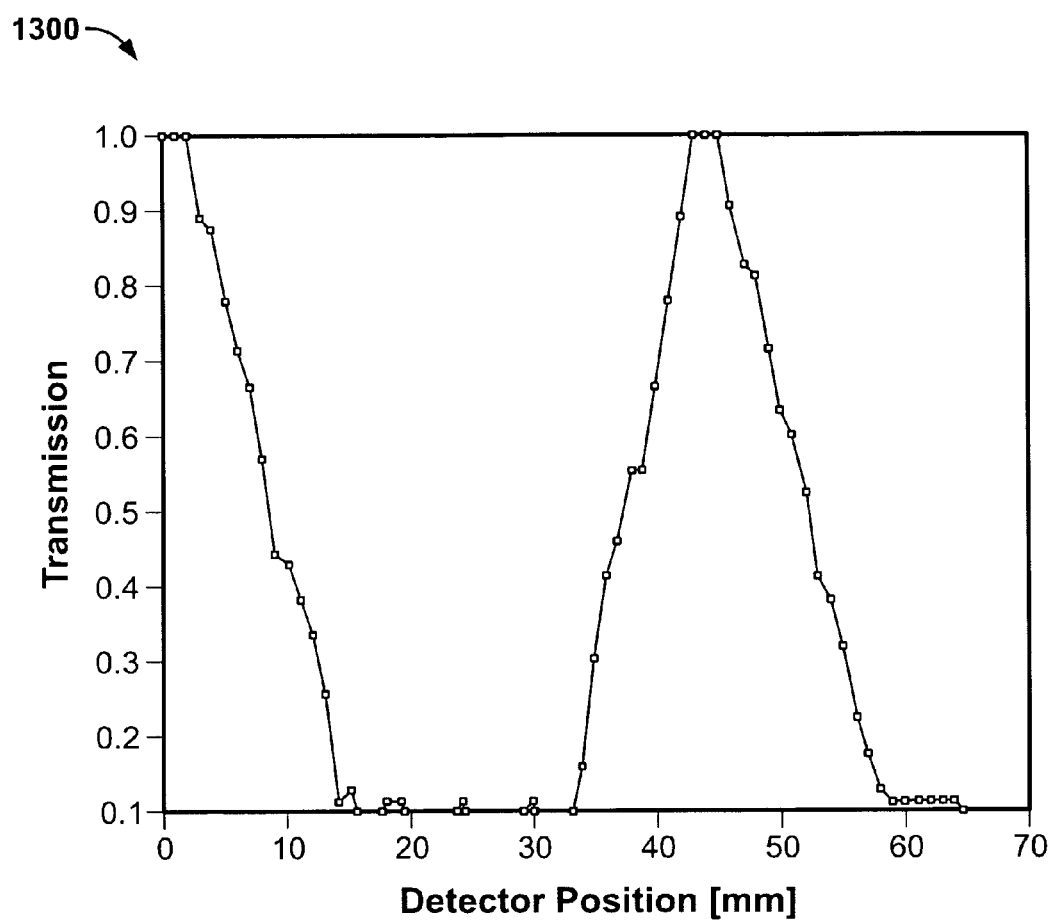
FIG. 13 is an embodiment of a graph of a transmission profile created by a processor of the system of FIG. 2.

FIG. 13 is an embodiment of a graph of a transmission profile 1300 created by processor 190. Processor 190 plots, in transmission profile 1300, a probability of detecting x-ray photons by at least one transmission detector including transmission detector 17 versus at least position along the at least one transmission detector. When a width, such as width 1126, of a virtual collimator channel, such as virtual collimator channel 1130, coincident with curve 810, is at most equal to a ratio of distance 842 between centers of two adjacent virtual x-ray sources, such as virtual x-ray sources 802 and 804, and a number, such as three, of virtual detectors 812, 814, and 1106, a plurality of distinct transmission peaks, visible in transmission profile 1300, are generated and scatter is reduced. In an alternative embodiment, when a width of a virtual collimator channel, coincident with curve 810, is at most equal to a ratio of distance 842 between centers of two adjacent one of virtual x-ray sources 802, 804, and 806 and a number of virtual detectors 812 and 814, a plurality of separate transmission peaks, visible in transmission profile 1300, are generated and the unnecessary scatter is reduced. In the alternative embodiment, when a ratio of a width, such as width 834, of a virtual collimator channel, such as virtual collimator channel 830, to a distance, such as distance 842, between adjacent virtual x-ray sources, such as virtual x-ray sources 804 and 806, is less than or alternatively equal to an inverse of a number, such as two, of virtual detectors, such as virtual detectors 812 and 814, a plurality of distinct transmission peaks, visible in transmission profile 1300, are generated and scatter is reduced. The transmission peaks are used to identify substance 82. The unnecessary scatter interferes with an identification of the transmission peaks.

It is noted that the user protects collimator channels 912, 914, 916, 918, 920, and 922 by placing a face plate on collimator channels 912, 914, 916, 918, 920, and 922 and/or by filling collimator channels 912, 914, 916, 918, 920, and 922 with foam. Moreover, the user protects collimator channels 1202, 1204, and 1206 by placing a face plate on collimator channels 1202, 1204, and 1206 and/or by filling collimator channels 1202, 1204, and 1206 with foam. Technical effects of the herein described systems and methods for developing a primary collimator include creating and fabricating primary collimator 14 that is a multi-focus primary collimator. For example, each primary collimator block 910 and 1000 is a bifocal primary collimator. As another example, primary collimator block 1200 is a trifocal primary collimator.

While the invention has been described in terms of various specific embodiments, those skilled in the art will recognize that the invention can be practiced with modification within the spirit and scope of the claims.

What is claimed is:

1. A method for developing a multi-focus primary collimator, said method comprising:
    creating a virtual system comprising a first source, a collimator block and a first detector;
    extending a first beam in the virtual system from the first source via the collimator block to the first detector;
    selecting a size of the first beam based on a configuration of the virtual system; and
    displaying the virtual system to a user via a display device.

2. A method in accordance with claim 1, wherein the virtual system further comprises a second detector, the method further comprising:
    extending a second beam in the virtual system from the first source via the collimator block to the second detector; and
    selecting a size of the second beam based on a configuration of the virtual system.

3. A method in accordance with claim 1, wherein the virtual system further comprises a second source, the method further comprising establishing a width of the first beam based on a distance between the first source and the second source.

4. A method in accordance with claim 1, wherein the virtual system further comprises a second source adjacent to the first source, the method further comprising establishing a width of the first beam based on a distance between the first source and the second source.

5. A method in accordance with claim 1, wherein the virtual system further comprises a second source, the method further comprising establishing a width of the first beam based on a distance between the first source and the second source and based on a number of detectors in the virtual system including the first detector.

6. A method in accordance with claim 1, wherein the virtual system further comprises a second source and a second detector, the method further comprising establishing a width of the first beam based on a distance between the first source and the second source and based on a number of detectors in the virtual system including the first detector and the second detector, wherein the first detector receives the first beam and the second detector receives a second beam from the first source.

7. A method in accordance with claim 1, wherein the virtual system further comprises a gantry, and wherein the collimator block includes a primary collimator placed between the first source and an opening of the gantry.

8. A method in accordance with claim 1 further comprising developing a virtual collimator channel, within the collimator block, at a passage of the first beam via the collimator block.

9. A method in accordance with claim 1, wherein the virtual system further comprises a second detector, the method further comprising:
    extending a second beam from the first source via the collimator block to the second detector:
    selecting a size of the second beam based on a configuration of the virtual system; and
    developing a first virtual channel, within the collimator block, at a plurality of positions of a passage of the first beam via the collimator block; and
    developing a second virtual channel, within the collimator block, at a plurality of positions of a passage of the second beam via the collimator block.

10. A processor configured to:
    create a virtual system comprising a first source, a collimator block and a first detector;
    extend a first beam from the first source via the collimator block to the first detector;
    select a size of the first beam based on a configuration of the virtual system; and
    present the virtual system to a user on a display device.

11. A processor in accordance with claim 10, wherein the virtual system further comprises a second detector, the processor further configured to:
    extend a second beam from the first source via the collimator block to the second detector; and
    select a size of the second beam based on a configuration of the virtual system.

12. A processor in accordance with claim 10, wherein the virtual system further comprises a second source, the processor further configured to establish a width of the first beam based on a distance between the first source and the second source.

13. A processor in accordance with claim 10, wherein the virtual system further comprises a second source adjacent the first source, the processor further configured to establish a width of the first beam based on a distance between the first source and a second source.

14. A processor in accordance with claim 10, wherein the virtual system further comprises a second source, the processor further configured to establish a width of the first beam based on a distance between the first source and the second source and based on a number of detectors in the virtual system including the first detector.

15. A processor in accordance with claim 10, wherein the virtual system further comprises a second source and a second detector, the processor further configured to establish a width of the first beam based on a distance between the first source and the second source and based on a number of detectors in the virtual system including the first detector and the second detector, wherein the first detector receives the first beam and the second detector receives a second beam from the first source.

16. An imaging system comprising:
    at least one actual source configured to generate energy;
    at least one actual detector configured to detect a portion of the energy; and
    a processor configured to:
        create a virtual system embodying a relative placement of the at least one actual source and the at least one actual detector, the virtual system comprising a first source, a collimator block and a first detector;
        extend a first beam from the first source via the collimator block to the first detector;

select a size of the first beam based on a configuration of the virtual system; and present the virtual system to a user on a display device.

17. An imaging system in accordance with claim 16, wherein the virtual system further comprises a second detector and wherein said processor is further configured to:

extend a second beam from the first source via the collimator block to the second detector; and select a size of the second beam based on a configuration of the virtual system.

18. An imaging system in accordance with claim 17 further comprising an actual collimator block, wherein the size of the first beam is used to develop a first collimator channel in the actual collimator block and the size of the second beam is used to develop a second collimator channel in the actual collimator block.

19. An imaging system in accordance with claim 16, wherein the virtual system further comprises a second source and wherein said processor is further configured to establish a width of the first beam based on a distance between the first source and the second source.

20. An imaging system in accordance with claim 16, wherein the virtual system further comprises a second source adjacent to the first source and wherein said processor is further configured to establish a width of the first beam based on a distance between the first source and the second source.

21. An imaging system in accordance with claim 16, wherein the virtual system further comprises a second source and wherein said processor is further configured to establish a width of the first beam based on a distance between the first source and the second source and based on a number of detectors in the virtual system including the first detector.

22. An imaging system in accordance with claim 16 further comprising an actual collimator block, wherein the size of the first beam is used to develop a first collimator channel in the actual collimator block.

* * * * *